US012227291B2

(12) United States Patent
Fenny et al.

(10) Patent No.: US 12,227,291 B2
(45) Date of Patent: Feb. 18, 2025

(54) DISTRIBUTED PROPULSION SYSTEM FOR VERTICAL TAKE OFF AND LANDING CLOSED WING AIRCRAFT

(71) Applicant: TEXTRON INNOVATIONS INC., Providence, RI (US)

(72) Inventors: Carlos Alexander Fenny, Fort Worth, TX (US); Rohn Lee Olson, Hurst, TX (US); Andrew James Zahasky, North Richland Hills, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 121 days.

(21) Appl. No.: 18/168,683

(22) Filed: Feb. 14, 2023

(65) Prior Publication Data

US 2023/0382526 A1 Nov. 30, 2023

Related U.S. Application Data

(63) Continuation of application No. 16/920,017, filed on Jul. 2, 2020, now Pat. No. 11,613,355, which is a
(Continued)

(51) Int. Cl.
*B64C 29/02* (2006.01)
*B64C 1/06* (2006.01)
(Continued)

(52) U.S. Cl.
CPC .............. *B64C 29/02* (2013.01); *B64C 1/068* (2013.01); *B64C 3/10* (2013.01); *B64C 3/16* (2013.01);
(Continued)

(58) Field of Classification Search
CPC .... B64C 29/0025; B64C 29/02; B64C 39/062
See application file for complete search history.

(56) References Cited

U.S. PATENT DOCUMENTS

D174,679 S 5/1955 Cochran
D181,599 S 12/1957 Nelson et al.
(Continued)

FOREIGN PATENT DOCUMENTS

CA 2827210 A1 8/2012
CN 105438464 A2 11/2007
(Continued)

OTHER PUBLICATIONS

Aurora Flight Sciences "Aurora Wins DARPA Contract for Nation's Next VTOL X-Plane" (http://www.aurora.aero/lightningstrike/) 2015.
(Continued)

*Primary Examiner* — Nicholas McFall
(74) *Attorney, Agent, or Firm* — Daniel J. Chalker; Edwin S. Flores; Chalker Flores, LLP

(57) ABSTRACT

An aircraft includes a closed wing, a fuselage at least partially disposed within a perimeter of the closed wing, and one or more spokes coupling the closed wing to the fuselage. A source of electric power is disposed within or attached to the closed wing, fuselage or one or more spokes. A plurality of electric motors are disposed within or attached to the one or more spokes in a distributed configuration. Each electric motor is connected to the source of electric power. A propeller is operably connected to each of the electric motors and proximate to a leading edge of the one or more spokes. One or more processors are communicably coupled to the plurality of electric motors. A longitudinal axis of the fuselage is substantially vertical in vertical takeoff and landing and stationary flight, and substantially in a direction of a forward flight in a forward flight mode.

20 Claims, 29 Drawing Sheets

Related U.S. Application Data continuation of application No. 15/593,575, filed on May 12, 2017, now Pat. No. 10,737,786.

(60) Provisional application No. 62/336,290, filed on May 13, 2016, provisional application No. 62/336,432, filed on May 13, 2016, provisional application No. 62/336,363, filed on May 13, 2016, provisional application No. 62/336,420, filed on May 13, 2016, provisional application No. 62/336,465, filed on May 13, 2016.

(51) Int. Cl.
| | |
|---|---|
| B64C 3/10 | (2006.01) |
| B64C 3/16 | (2006.01) |
| B64C 11/28 | (2006.01) |
| B64C 27/08 | (2023.01) |
| B64C 27/12 | (2006.01) |
| B64C 27/50 | (2006.01) |
| B64C 29/00 | (2006.01) |
| B64C 39/02 | (2023.01) |
| B64C 39/06 | (2006.01) |
| B64D 27/24 | (2006.01) |
| B64D 31/00 | (2006.01) |
| B64U 10/20 | (2023.01) |
| B64U 30/293 | (2023.01) |
| B64C 1/00 | (2006.01) |
| B64C 39/00 | (2023.01) |
| B64D 27/02 | (2006.01) |
| B64U 30/10 | (2023.01) |
| B64U 50/11 | (2023.01) |
| B64U 50/12 | (2023.01) |
| B64U 50/19 | (2023.01) |
| B64U 60/50 | (2023.01) |

(52) U.S. Cl.
CPC .............. *B64C 11/28* (2013.01); *B64C 27/08* (2013.01); *B64C 27/12* (2013.01); *B64C 27/50* (2013.01); *B64C 29/0025* (2013.01); *B64C 39/024* (2013.01); *B64C 39/06* (2013.01); *B64C 39/062* (2013.01); *B64D 27/24* (2013.01); *B64D 31/00* (2013.01); *B64U 10/20* (2023.01); *B64U 30/293* (2023.01); *B64C 2001/0045* (2013.01); *B64C 39/029* (2020.01); *B64D 27/026* (2024.01); *B64U 30/10* (2023.01); *B64U 50/11* (2023.01); *B64U 50/12* (2023.01); *B64U 50/19* (2023.01); *B64U 60/50* (2023.01)

(56) References Cited

U.S. PATENT DOCUMENTS

| | | |
|---|---|---|
| D185,870 S | 8/1959 | Apostolescu |
| 3,005,603 A | 10/1961 | Gaskins |
| D193,245 S | 7/1962 | Know, Jr. |
| 3,082,977 A | 3/1963 | Arlin |
| D197,447 S | 2/1964 | Friedrich |
| 3,343,768 A | 9/1967 | Gartzke |
| 3,350,035 A | 10/1967 | Schlieben |
| D213,708 S | 4/1969 | Blumenthal |
| D214,577 S | 7/1969 | Mueller |
| 3,640,489 A | 2/1972 | Jaeger |
| 3,823,898 A | 7/1974 | Eickmann |
| 3,834,654 A | 9/1974 | Miranda |
| D241,565 S | 9/1976 | Molenaar |
| D314,549 S | 2/1991 | Myers |
| 5,062,587 A | 11/1991 | Wernicke |
| D324,890 S | 3/1992 | Smiel |
| 5,114,096 A | 5/1992 | Wernicke |
| 5,150,857 A | 9/1992 | Moffet et al. |
| 5,178,344 A | 1/1993 | Dlouhy |
| 5,305,970 A | 4/1994 | Porter et al. |
| 5,351,911 A | 10/1994 | Neumayr |
| 5,595,358 A | 1/1997 | Demidov et al. |
| D379,339 S | 5/1997 | Guspodin et al. |
| 6,382,560 B1 | 5/2002 | Ow |
| 6,607,162 B2 | 8/2003 | Warsop et al. |
| 6,688,936 B2 | 2/2004 | Davis |
| 6,921,313 B2 | 7/2005 | Yu |
| D543,928 S | 6/2007 | Sanders, Jr. et al. |
| 7,370,828 B2 | 5/2008 | Stephens |
| 7,658,346 B2 | 2/2010 | Goossen |
| 7,794,302 B2 | 9/2010 | Davis |
| D640,757 S | 6/2011 | Cheng |
| 8,083,173 B2 | 12/2011 | Arlton et al. |
| D664,214 S | 7/2012 | Yuen |
| D679,340 S | 4/2013 | Genovese |
| 8,408,489 B2 | 4/2013 | Gosling |
| 8,733,690 B2 | 5/2014 | Bevirt et al. |
| D740,892 S | 10/2015 | Chen |
| 9,156,545 B1 | 10/2015 | Fenny et al. |
| 9,242,729 B1 | 1/2016 | Wang et al. |
| 9,527,581 B2 | 12/2016 | Bevirt et al. |
| 2002/0142699 A1 | 10/2002 | Davis |
| 2006/0108477 A1 | 5/2006 | Helou, Jr. |
| 2006/0151666 A1 | 7/2006 | Vandermey et al. |
| 2007/0069065 A1 | 3/2007 | Parks |
| 2007/0215746 A1 | 9/2007 | Reiken et al. |
| 2010/0025526 A1 | 2/2010 | Lawrence |
| 2010/0072325 A1 | 3/2010 | Sambell |
| 2011/0042509 A1 | 2/2011 | Bevirt et al. |
| 2012/0083945 A1 | 4/2012 | Oakley et al. |
| 2013/0183169 A1 | 7/2013 | Buono et al. |
| 2013/0241086 A1 | 9/2013 | Kroo |
| 2014/0097290 A1 | 4/2014 | Leng |
| 2014/0217229 A1 | 8/2014 | Chan |
| 2015/0012154 A1 | 1/2015 | Senkel et al. |
| 2015/0108280 A1 | 4/2015 | Willard, Jr. |
| 2015/0183514 A1 | 7/2015 | Page et al. |
| 2015/0217851 A1 | 8/2015 | Kelso |
| 2015/0274290 A1 | 10/2015 | Fenny et al. |
| 2016/0026190 A1 | 1/2016 | Kowalski |
| 2016/0031555 A1 | 2/2016 | Bevirt et al. |
| 2016/0048132 A1 | 2/2016 | Cherpinsky et al. |
| 2016/0107751 A1 | 4/2016 | D'Andrea |
| 2016/0137304 A1 | 5/2016 | Phan et al. |
| 2016/0170416 A1 | 6/2016 | Chen et al. |
| 2016/0214728 A1 | 7/2016 | Rossi et al. |
| 2016/0265631 A1 | 9/2016 | Strashny et al. |
| 2018/0016022 A1 | 1/2018 | Ljung |
| 2018/0186445 A1 | 7/2018 | Fenny et al. |
| 2018/0244364 A1 | 7/2018 | Fenny et al. |
| 2018/0215462 A1 | 8/2018 | Fenny et al. |
| 2018/0244376 A1 | 8/2018 | Fenny et al. |
| 2018/0244381 A1 | 8/2018 | Fenny et al. |
| 2019/0023397 A1 | 1/2019 | Gang |

FOREIGN PATENT DOCUMENTS

| | | |
|---|---|---|
| DE | 2854977 A1 | 10/1980 |
| DE | 3240995 A1 | 3/1984 |
| EP | 2119626 A1 | 11/2009 |
| EP | 2733068 A2 | 5/2014 |
| EP | 3243745 A1 | 11/2017 |
| EP | 3243747 A1 | 11/2017 |
| EP | 3243750 A1 | 11/2017 |
| GB | 1085541 A | 10/1967 |
| GB | 1281382 A | 7/1972 |
| JP | 2014240242 | 12/2014 |
| SI | 21457 A | 9/2004 |
| WO | 1991/007314 | 5/1991 |
| WO | 2007/133182 A2 | 11/2007 |
| WO | 2015/102425 A1 | 9/2015 |
| WO | 2015/143093 A2 | 9/2015 |
| WO | 2016/068784 A1 | 5/2016 |

(56) References Cited

OTHER PUBLICATIONS

Canadian Intellectual Property Office, Examination Report for Canadian Appl. No. 2,967,221 dated Mar. 27, 2018, 4 pp.
Canadian Intellectual Property Office, Examination Report for Canadian Appl. No. 2,967,402 dated Sep. 5, 2018, 6 pp.
Canadian Intellectual Property Office, Examination Report for Canadian Appl. No. 2,967,402 dated May 31, 2019, 4 pp.
Canadian Intellectual Property Office, Examination Report for Canadian Appl. No. 2,967,221 dated Dec. 27, 2018, 4 pp.
Canadian Intellectual Property Office, Examination Report for Canadian Appl. No. 2,967,228 dated Sept. 7, 2018, 12 pp.
Canadian Intellectual Property Office, Examination Report for Canadian Appl. No. 2,967,228 dated May 13, 2019, 4 pp.
European Patent Office, European Search Report for EP Appl. No. 17170907.4 dated Oct. 5, 2017, 7 pp.
European Patent Office, European Search Report for EP Appl. No. 17170905.8 dated Sep. 21, 2017, 7 pp.
European Patent Office, European Search Report for EP Appl. No. 17170906.6 dated Oct. 2, 2017, 6 pp.
European Patent Office, Communication pursuant to Article 94(3) EPC for EP Appl. No. 17170905.8 dated Oct. 12, 2017, 9 pp.
European Patent Office, Communication pursuant to Article 94(3) EPC for EP Appl. No. 17170905.8 dated Mar. 19, 2018, 7 pp.
European Patent Office, Communicaiton pursuant to Article 94(3) EPC for EP Appl. No. 17170905.8 dated Sep. 24, 2018, 6 pp.
European Patent Office, Communication pursuant to Article 94(3) EPC for EP Appl. No. 17170906.6 dated Oct. 20, 2017, 8 pp.
European Patent Office, Communication pursuant to Article 94(3) EPC for EP Appl. No. 17170906.6 dated Mar. 19, 2018, 6 pp.
European Patent Office, Communication pursuant to Article 94(3) EPC for EP Appl. No. 17170907.4 dated Oct. 24, 2017, 9 pp.
European Patent Office, Communication pursuant to Article 94(3) EPC for EP Appl. No. 17170907.4 dated Apr. 16, 2018, 6 pp.
European Patent Office, Communication pursuant to Article 94(3) EPC for EP Appl. No. 17170907.4 dated Sep. 13, 2018, 7 pp.
Felder, et al. "Turboelectric Distributed Propulsion Engine Cycle Analysis for Hybrid-Wing-Body Aircraft" American Institute of Aeronautics and Astronautics, 25 pp. Jan. 2009.
Garrow—Title: "Proto10 hovering and translating at NASA AMES" by Oliver Garrow, Published/Posted on Aug. 19, 2017, Site Name:YOUTUBE:COM, URL:https://www.youtube.com/watch?v=KdGo0Gikx_Y&feature=youtu.be.
Goruney, et al. "Flow past a delta wing with a sinusoidal leading edge: near-surface topology and flow structure" Experiments in Fluids; Experimental Methods and Their Applications to Fluid Flow, Springer, Berlin, DE, vol. 47, No. 2, May 10, 2009 pp. 321-331, XP019739243, ISSN: 1432-1114, doi: 10.1007/s00348-009-0666-x / Abstract Only.
Nasa, "Release 16-060" Jun. 17, 2016 (http://www.nasa.gov/press-release/nasa-electric-research-plane-gets-x-n . . . ).
Onera the French Aerospace Lab "Prospective Electrical aircraft: daring to make a breakthrough to meet the challenge" Annual Report 2014 (http://w3.onera.fr/rapport-annuel/en/2014/prospective) 2 pp.
Perry, et al. "Systems review exercise @BULLET to be posted this weekend @BULLET due next Friday (3/6) coming week: @BULLET Lab 13: Hydraulic power Steering @BULLET Lab 14: Integrated Lab (Hydraulic test bench) Topics today: @ BULLET Pumps and motors @ BULLET (Hydraulic hybrids)", Jan. 1, 2004, ZP055457362, Retried from the Internet: URL:http://www.me.umn.edu/courses/me4232/Lectures/Lect6_S15.pdf.
Schiltgen, et al. "Hybrid-electric distributed propulsion explored" SAE International, Apr. 4, 2014 (http://articles.sae.org/13049/).
Stoll, et al. "A Multifunctional Rotor Concept for Quiet and Efficient VTOL Aircraft" Aviation Technology, Integration, and Operations Conference, Aug. 12-14, 2013, Los Angeles, CA , American Institute of Aeroneautics and Astronauts, 7 pp.
Stoll, et al. "Concept Design of the Joby S2 Electric VTOL PAV" Aviation Technology, Integration, and Operations Conference, Jun. 16-20, 2014, Atlanta, GA, American Institute of Aeronautics and Astronauts, 6 pp.
Canadian Intellectual Property Office, Examination Report for Canadian Appl. No. 3,099,918 dated Jan. 20, 2022, 3 pp.
Canadian Intellectual Property Office, Examination Report for Canadian Appl. No. 2,967,402 dated Dec. 5, 2019, 4 pp.

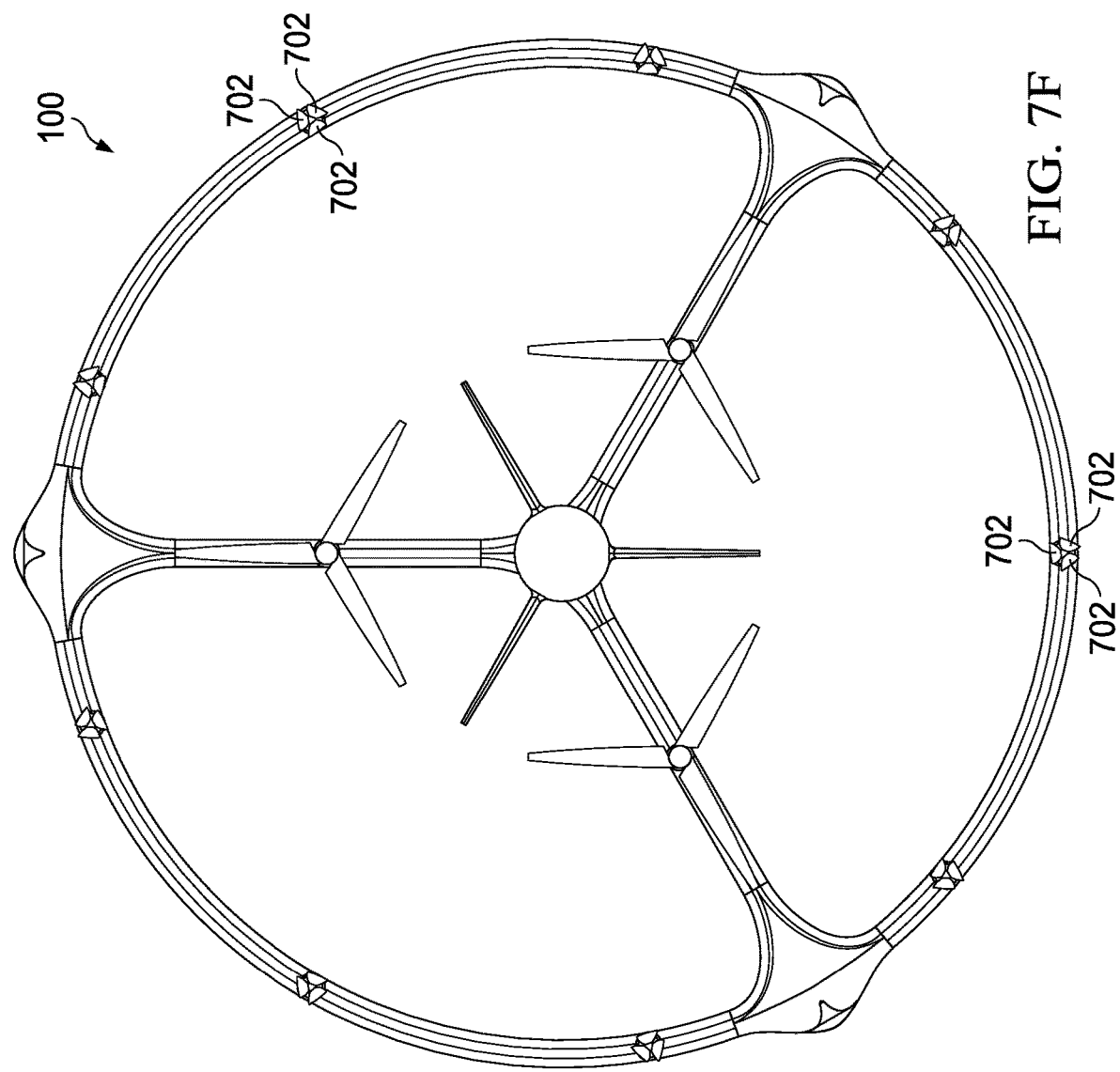

DISTRIBUTED PROPULSION SYSTEM FOR VERTICAL TAKE OFF AND LANDING CLOSED WING AIRCRAFT

CROSS-REFERENCE TO RELATED APPLICATIONS

This application is a continuation application of U.S. patent application Ser. No. 16/920,017, filed Jul. 2, 2020, which is a continuation application of U.S. patent application Ser. No. 15/593,575, filed May 12, 2017, now U.S. Pat. No. 10,737,786, which claims priority to U.S. Provisional Application Ser. No. 62/336,290, filed May 13, 2016 entitled "Distributed Propulsion", U.S. Provisional Application Ser. No. 62/336,432, filed May 13, 2016 entitled "Forward Folding Rotor Blades", U.S. Provisional Application Ser. No. 62/336,363, filed May 13, 2016 entitled "Vertical Take Off and Landing Closed Wing Aircraft", U.S. Provisional Application Ser. No. 62/336,420, filed May 13, 2016 entitled "Distributed Propulsion System for Vertical Take Off and Landing Closed Wing Aircraft", and U.S. Provisional Application Ser. No. 62/336,465, filed May 13, 2016 entitled "Modular Fuselage Sections for Vertical Take Off and Landing Distributed Airframe Aircraft", the entire contents of which are incorporated herein by reference.

TECHNICAL FIELD OF THE INVENTION

The present invention relates in general to the field of aircraft design, and more particularly, to distributed propulsion systems for vertical takeoff and landing closed wing aircraft.

STATEMENT OF FEDERALLY FUNDED RESEARCH

None.

BACKGROUND OF THE INVENTION

Without limiting the scope of the invention, its background is described in connection with aircraft. Based on a classical helicopter configuration improvements in helicopter productivity have been, at best, only incremental. A classical helicopter configuration includes certain fundamental limitations that hamper improvements, e.g., retreating blade stall, blade loading, advancing blade tip Mach number, and the large increases in power that are required with increased speed. These physical limitations contribute to increased vibration resulting poor ride quality and reduced component life. In addition, certain physical limitations lead to increased size and weight.

The classical approach to this problem is to develop helicopters in which these configuration limitations are addressed via ancillary devices, such as wings, additional engines, and propellers. Incorporation of these approaches, due to their increased complexity and weight, reduces the economic load carrying capability of the helicopter and raises questions as to the safety of operation of the helicopter and its long term reliability. Although the development of compound helicopters with wings, additional engines, and propellers represents significant improvements in helicopter productivity, considerable shortcomings remain.

SUMMARY OF THE INVENTION

In one embodiment, an aircraft is capable of vertical takeoff and landing, stationary flight and forward flight. The aircraft includes a closed wing, a fuselage at least partially disposed within a perimeter of the closed wing and one or more spokes coupling the closed wing to the fuselage. A source of electric power is disposed within or attached to the closed wing, fuselage or one or more spokes. A plurality of electric motors are disposed within or attached to the one or more spokes in a distributed configuration. Each electric motor is connected to the source of electric power. A propeller is operably connected to each of the electric motors and proximate to a leading edge of the one or more spokes. One or more processors are communicably coupled to the plurality of electric motors. A longitudinal axis of the fuselage is substantially vertical in vertical takeoff and landing and stationary flight, and substantially in a direction of a forward flight in a forward flight mode.

In one aspect, the electric motors are selected based on at least one of aerodynamics, propulsive efficiency, structural efficiency, aeroelasticity, or weight of the aircraft. In another aspect, the aircraft is unmanned. In another aspect, the source of electric power comprises one or more batteries. In another aspect, the plurality of electric motors comprise six electric motors. In another aspect, the propeller comprises a constant pitch propeller. In another aspect, a controller is coupled between the one or more processors and each electric motor. In another aspect, the electric motors are self-cooling. In another aspect, the closed wing, the fuselage and the one or more spokes are symmetrically shaped to provide transition between vertical takeoff and landing, stationary flight and forward flight in any direction. In another aspect, the closed wing is polygonal-shaped.

In another embodiment, a method for distributed propulsion of an aircraft capable of vertical takeoff and landing, stationary flight and forward flight, includes providing a distributed propulsion system comprising: a closed wing, a fuselage at least partially disposed within a perimeter of the closed wing, one or more spokes coupling the closed wing to the fuselage, a source of electric power disposed within or attached to the closed wing, fuselage or one or more spokes, a plurality of electric motors disposed within or attached to the one or more spokes in a distributed configuration, each electric motor connected to the source of electric power, a propeller operably connected to each of the electric motors and proximate to a leading edge of the one or more spokes, and one or more processors communicably coupled to the plurality of electric motors. The method also includes operating the aircraft in vertical takeoff and landing and stationary flight such that a longitudinal axis of the fuselage is substantially vertical, and operating the aircraft in a forward flight mode such that the longitudinal axis of the fuselage is substantially in a direction of a forward flight.

In one aspect, the method further comprises: determining at least one of aerodynamics, propulsive efficiency, structural efficiency, or weight of the aircraft; selecting a number, size and type of electric motors necessary to provide distributed propulsion for powered operations of the aircraft; and selecting the source of electric power having sufficient energy density to power the electric motors connected to propellers to operate the aircraft. In another aspect, a controller is coupled between the one or more processors and each electric motor. In another aspect, the source of electric power comprises one or more batteries. In another aspect, the plurality of electric motors comprise six electric motors. In another aspect, the propeller comprises a constant pitch propeller. In another aspect, the electric motors are self-cooling. In another aspect, the closed wing, the fuselage and the one or more spokes are symmetrically shaped to provide transition between vertical takeoff and landing, stationary flight and forward flight in any direction. In another aspect, the closed wing is polygonal-shaped.

In another embodiment, an aircraft is capable of vertical takeoff and landing, stationary flight and forward flight. The aircraft includes a polygonal-shaped closed wing, a fuselage at least partially disposed within a perimeter of the polygonal-shaped closed wing and six or more spokes coupling the polygonal-shaped closed wing to the fuselage. A source of electric power is disposed within or attached to the polygonal-shaped closed wing, fuselage or six or more spokes. A plurality of electric motors are disposed within or attached to the six or more spokes in a distributed configuration. Each electric motor is connected to the source of electric power. A propeller is operably connected to each of the electric motors and proximate to a leading edge of the six or more spokes. One or more processors are communicably coupled to the plurality of electric motors. A longitudinal axis of the fuselage is substantially vertical in vertical takeoff and landing and stationary flight, and substantially in a direction of a forward flight in a forward flight mode.

BRIEF DESCRIPTION OF THE DRAWINGS

The novel features believed characteristic of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 7F is a top plan view of the closed wing aircraft of FIG. 7A;

DETAILED DESCRIPTION OF THE INVENTION

Figure 1A:
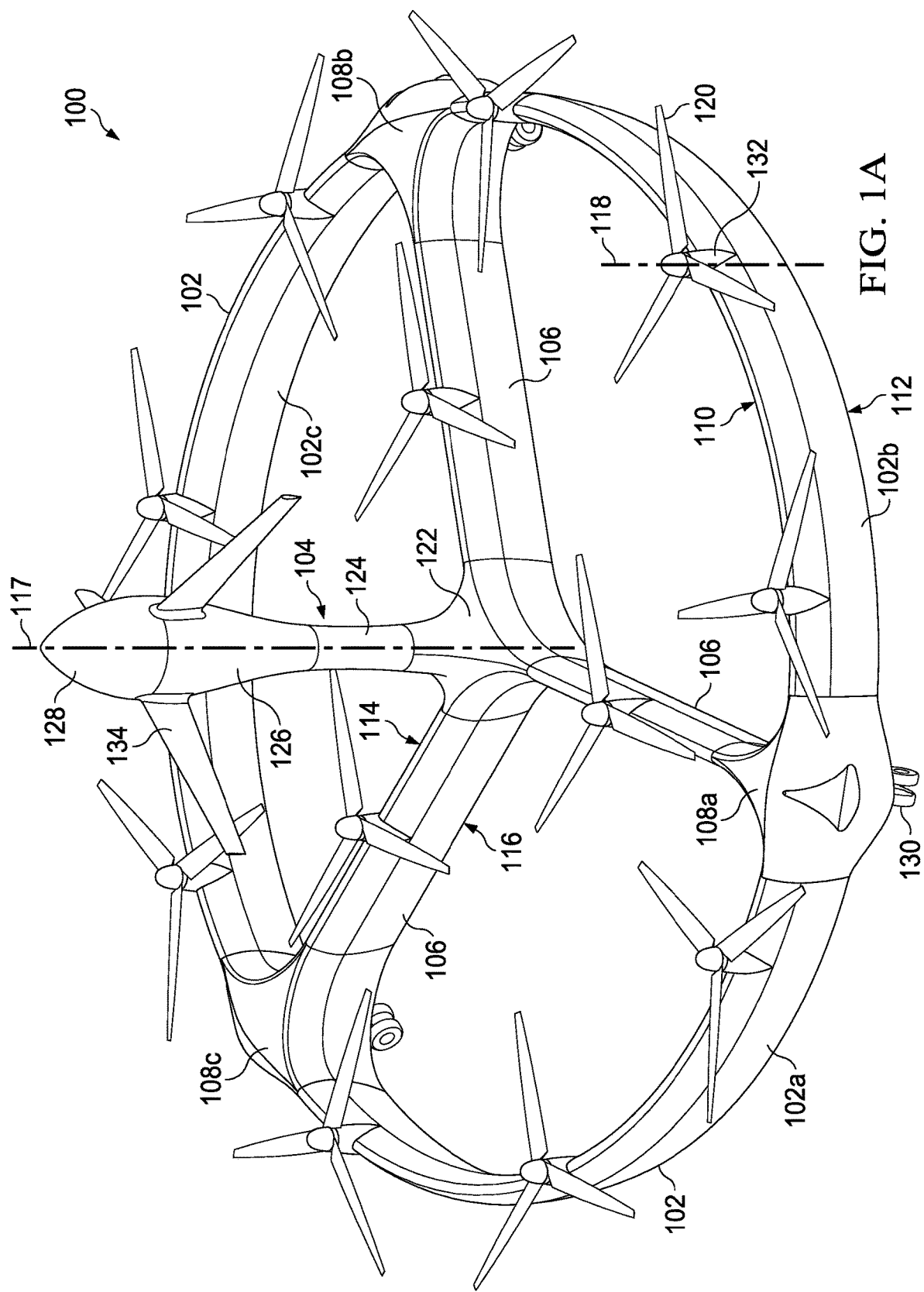
FIG. 1A is a perspective view of a closed wing aircraft in accordance with one embodiment of the present invention.

While the system of the present application is susceptible to various modifications and alternative forms, specific embodiments thereof have been shown by way of example in the drawings and are herein described in detail. It should be understood, however, that the description herein of specific embodiments is not intended to limit the present application to the particular forms disclosed, but on the contrary, the intention is to cover all modifications, equivalents, and alternatives falling within the spirit and scope of the present application as defined by the appended claims.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

In aerospace technology, distributed propulsion is defined as distributing the airflows and forces generated by the propulsion system about an aircraft in a way that improves the vehicle's aerodynamics, propulsive efficiency, structural efficiency, and aeroelasticity. While designs have been proposed in which airplanes include a series of small engines or motors along the surfaces and on vertical lift platforms by the assembly of a matrix of small engines or motors. However, the complexity and weight of installing large numbers of conventional turbine or internal combustion engines to achieve distributed propulsion is impractical for all but very large aircraft. For example, mechanically interconnecting multiple propellers using gearboxes and shafts to achieve distributed propulsion can reduce weight, but it sacrifices the ability to independently control propellers or fans to provide thrust vectoring for control and aerodynamic efficiency.

While many applications of electric motors to achieve practical distributed propulsion has attracted major interest by NASA, DARPA, and the aerospace industry, the power density necessary to attain and maintain flight using electric motors and batteries has simply not been feasible. While higher energy density batteries are in development, pure electric propulsion in combination with distributed propulsion, while attractive, has not been attained for anything except small drones and toys.

For example, current Li-ion battery technology is capable of achieving an energy density that would require an impractically heavy Li-ion battery. Thus, using current battery technology, electric distributed propulsion development requires the application of electric generators driven by turbo shaft engines. Replacing battery technology with generators driven by turbo shaft engines reduces system weight only marginally.

With the adoption of generators driven by turbo shaft engines in place of battery technology, the remaining major obstacle to achieving practical electric distributed propulsion is electric motor and associated controller technology. However, current electric motor technology and performance falls short of meeting the requirements for supporting practical application of distributed electric propulsion. As electric motor power and torque output is increased beyond the requirements of small drones to levels suitable for larger aircraft, the issues of power density (Watts of shaft power generated per kilogram of weight), cooling and lubrication lead to impractical increases in weight. Further, even when analyzing the performance of the most advanced electric motors the additional weight for cooling systems, lubrication systems, or required electric power controllers that regulate motor speed and torque are impractical or lead to no significant improvements in overall aircraft performance.

The present invention can use variable displacement hydraulic motors, with the advantage that speed and torque are controlled by changing the displacement of the motor. This is equivalent to having a variable speed transmission in a gearbox or being able to instantly change the size of an electric motor to suit required power demands. Changing the motor displacement requires very little power and can be achieved using servo valve adding very little weight. This added weight to control the hydraulic motor is independent of the rated power on the motor. When the added weight for the hydraulic motor controllers is added to the motor weight a significant improvement was obtained. Further, no additional weight for hydraulic motor lubrication or motor and controller cooling is required for hydraulic motors, as these are already part of the motor weight.

Further, when one compares the weight and volume of hydraulic tubing versus electrical cable required for transmission of power at the magnitudes required for larger aircraft, a benefit is also obtained, or, the values are basically equivalent. Thus, the hydraulic distributed propulsion system of the present invention is lighter than the most efficient, equivalent electric system.

Thus, the present invention takes advantage of the best cost-to-benefit ratio for use of hydraulic and electric motor propulsion. For example, the present invention uses the best of the possible high power systems performance aspects, including but not limited to, weight motor and controller, envelope for motor and controller installation, supplemental motor cooling required, supplemental motor lubrication required, high motor torque and low rotational inertia, motor reliability (not including controller), weight for transmission of power, and total system efficiency using engine.

The invention addresses the limitations of electric motor, generator and battery technology as applied to the field of distributed propulsion for aircraft. By using variable displacement hydraulic pump and motor technology, distributed propulsion for larger aircraft is practical. In variable displacement hydraulic motors, speed and torque is controlled by changing the displacement of the motor. This is equivalent to having a variable speed transmission in a gearbox or being able to instantly change the size of an electric motor to suit required power demands. Compared with controlling electric motor speed using Pulse Width Modulation, changing hydraulic motor displacement requires very little power and negligible weight.

As will be described in more detail below, various embodiments of the present invention integrate a circular wing or ring wing configuration with a distributed a propulsion system to create a vertical takeoff and landing (VTOL) aircraft configuration with long range and high speed. These performance capabilities are achieved without increased aircraft complexity and cost normally incurred with this level of capability in a VTOL aircraft. No reconfiguration of the aircraft is required to transition between vertical hover and horizontal airplane mode flight. The "tail sitter" or "pogo" configuration allows transition without any physical configurations. However, in some embodiments, structural, aerodynamic or power plant adjustments and/or reconfigurations may be desirable. In some embodiments, the rotor blades of the closed wing mounted propellers can be folded either forward or back to further reduce drag and provide increased speed and duration.

Figure 1B:
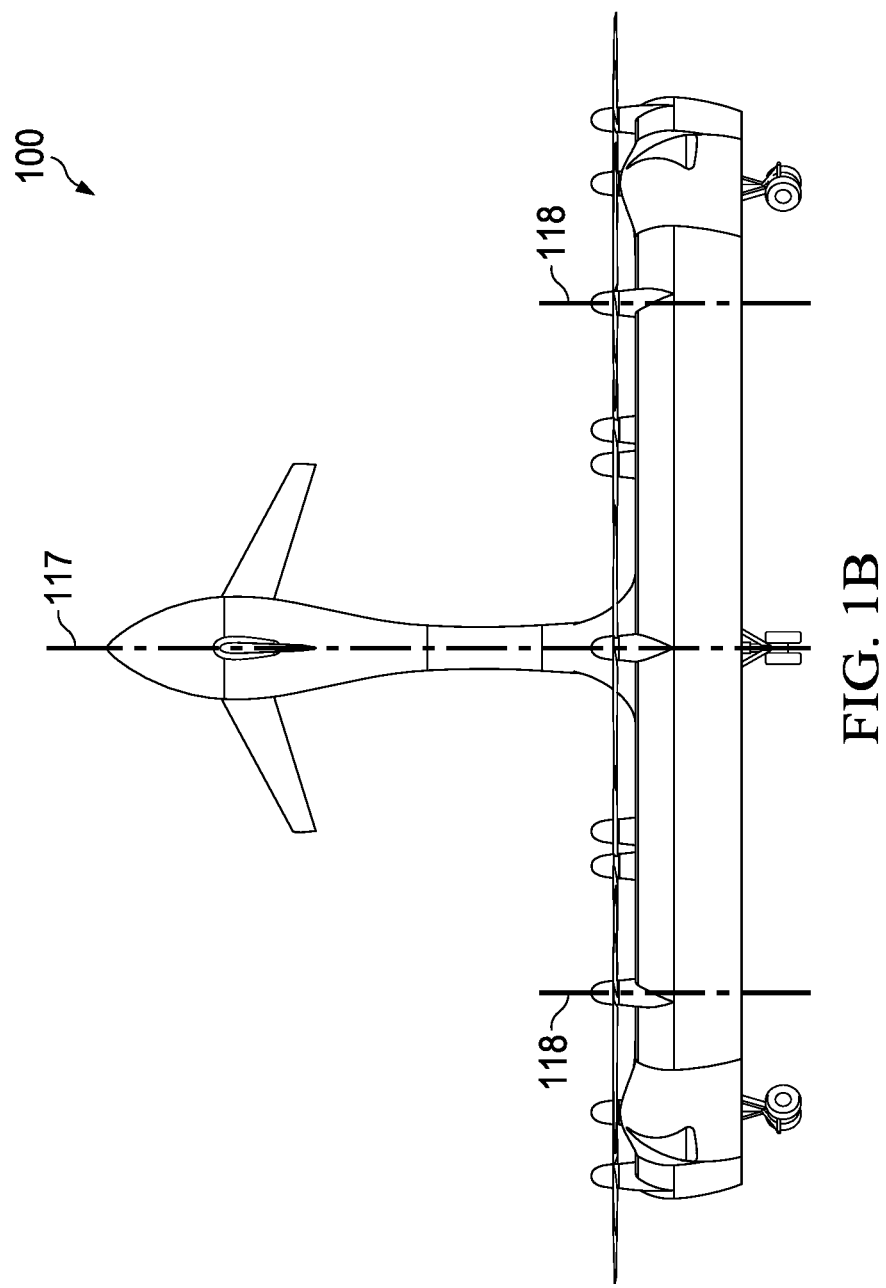
FIG. 1B is a front elevation view of the closed wing aircraft of FIG. 1A.
Figure 1C:
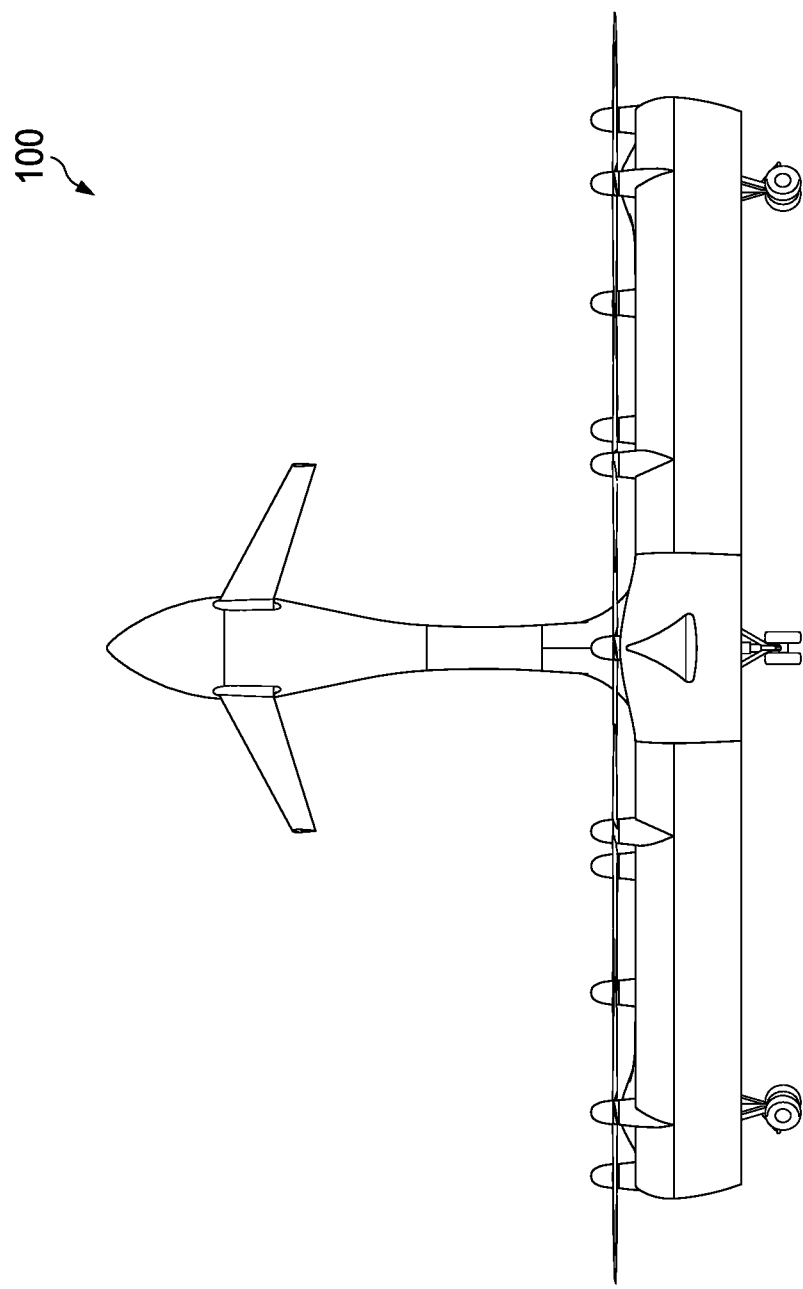
FIG. 1C is a rear elevation view of the closed wing aircraft of FIG. 1A.
Figure 1D:
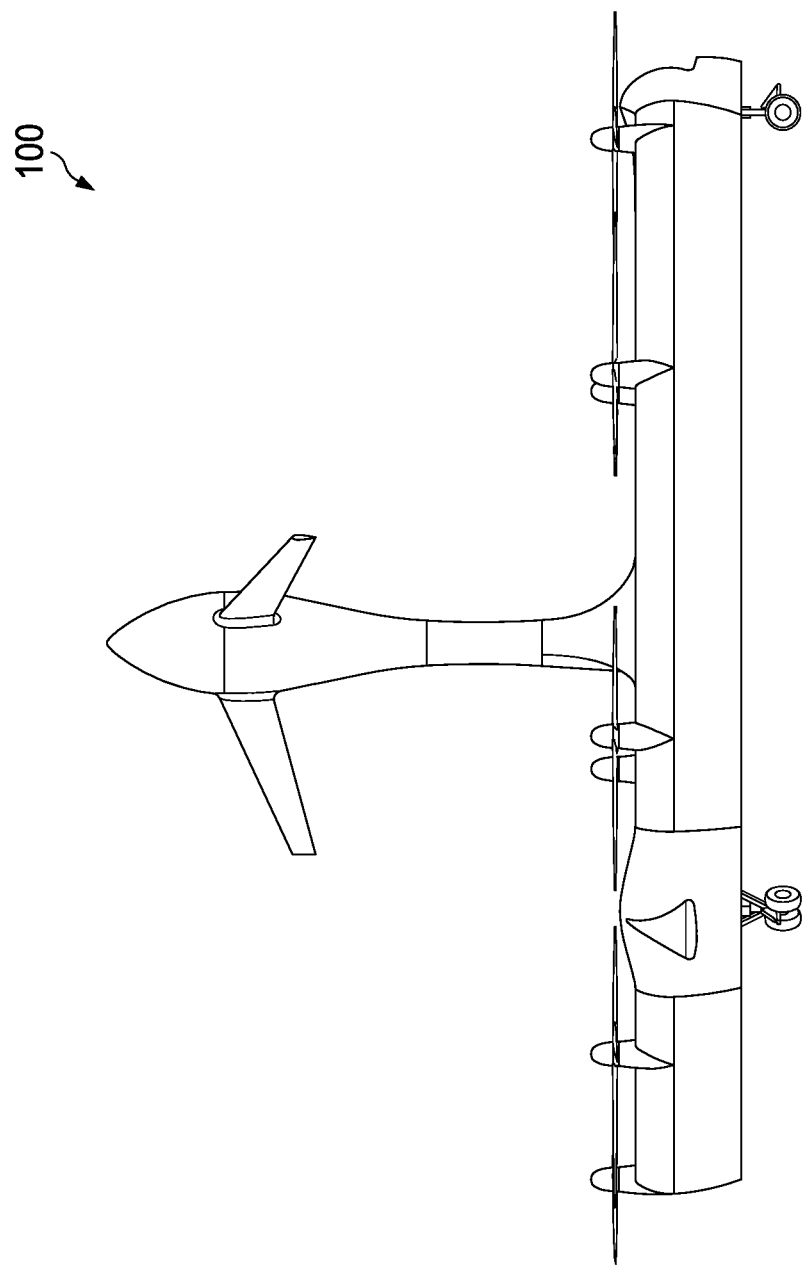
FIG. 1D is a right side elevation view of the closed wing aircraft of FIG. 1A.
Figure 1E:
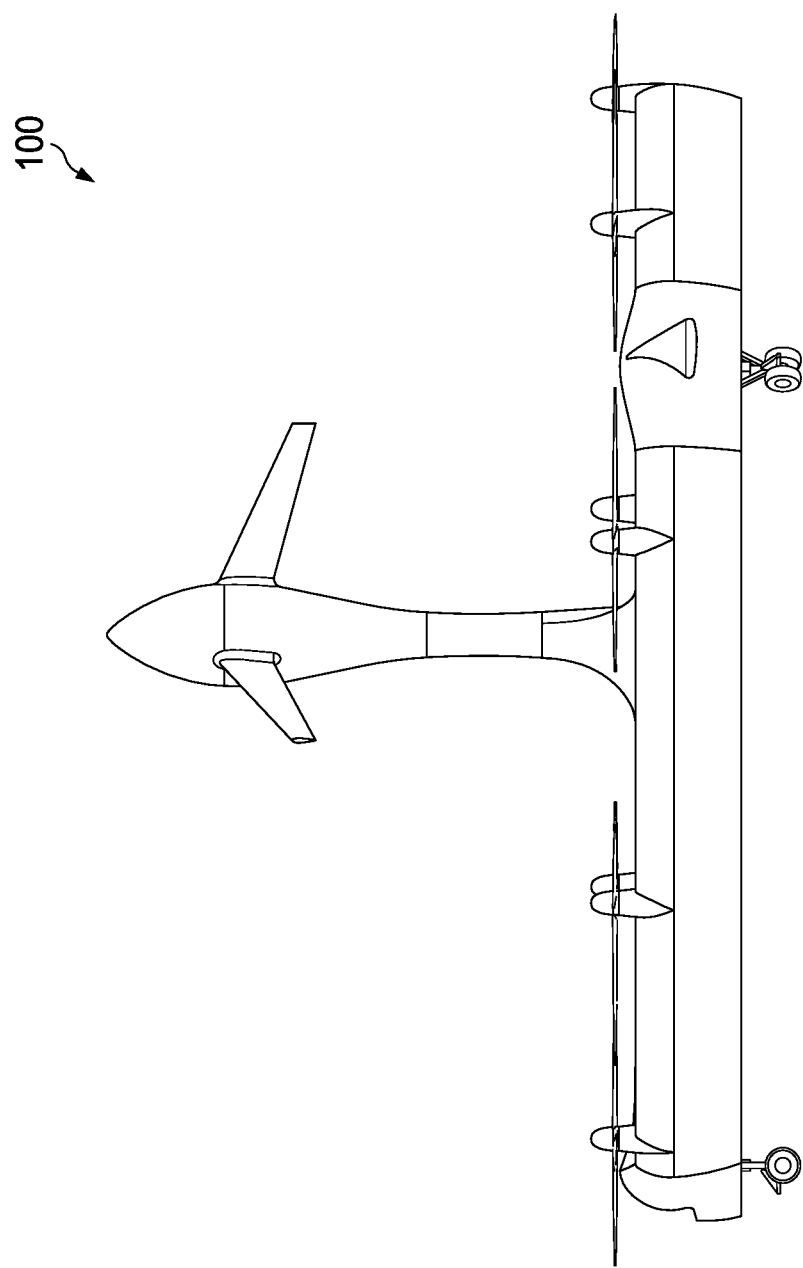
FIG. 1E is a left side elevation view of the closed wing aircraft of FIG. 1A.
Figure 1F:
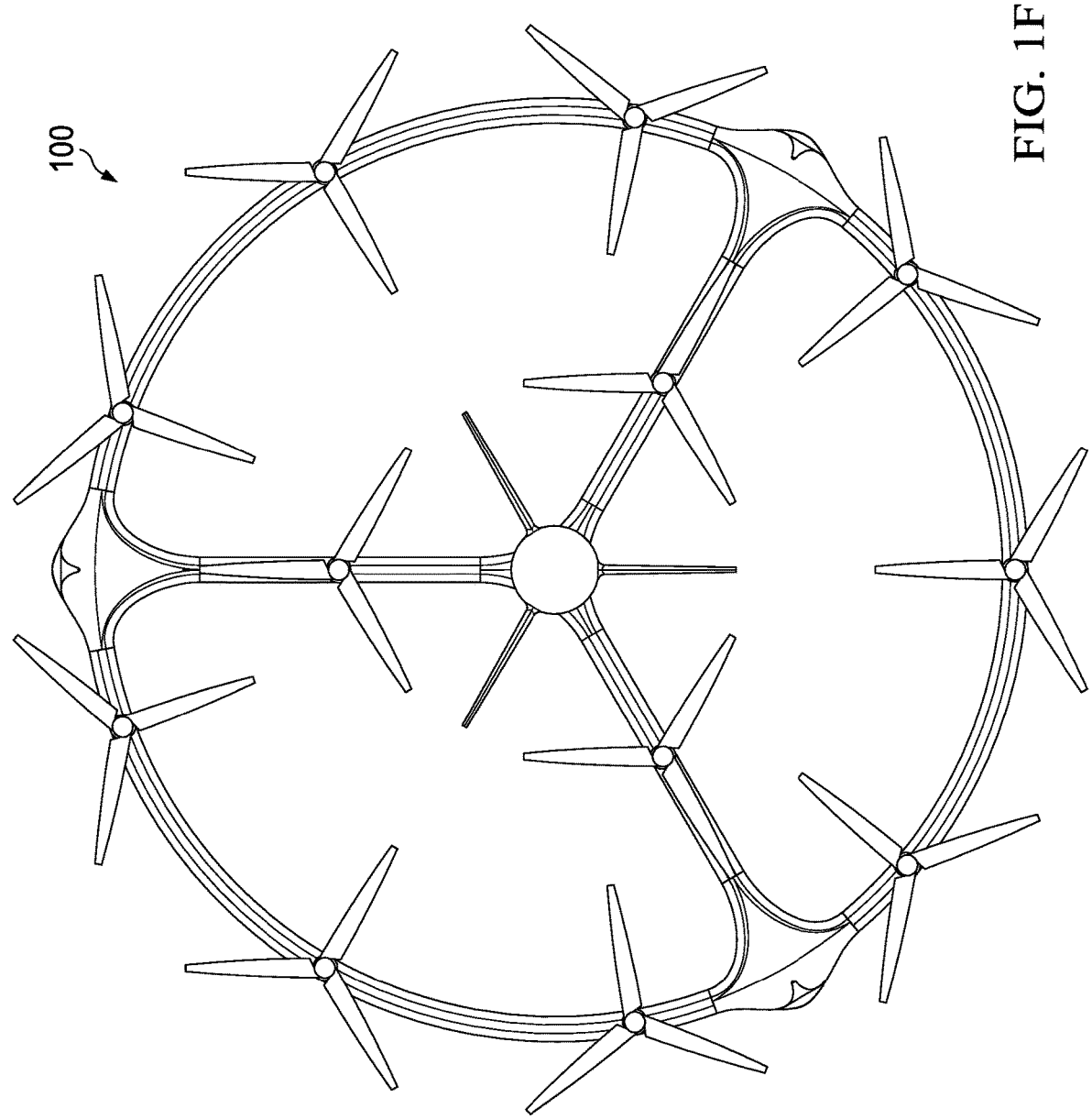
FIG. 1F is a top plan view of the closed wing aircraft of FIG. 1A.
Figure 1H:
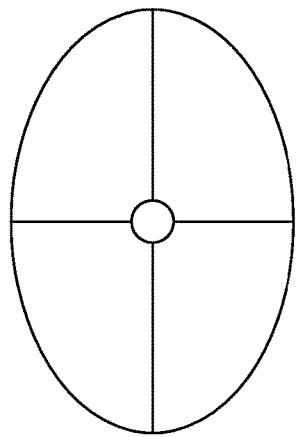
FIG. 1H is a top plan view of the closed wing aircraft of FIG. 1A having an oval-shaped closed wing.
Figure 1I:
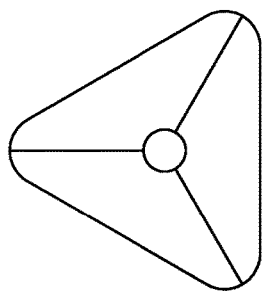
FIG. 1I is a top plan view of the closed wing aircraft of FIG. 1A having a triangular-shaped closed wing.
Figure 1J:
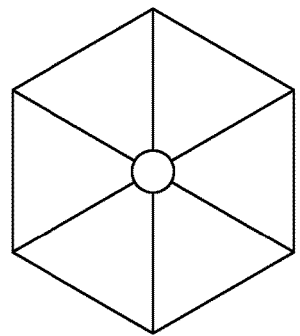
FIG. 1J is a top plan view of the closed wing aircraft of FIG. 1A having a polygonal-shaped closed wing.
Figure 1G:
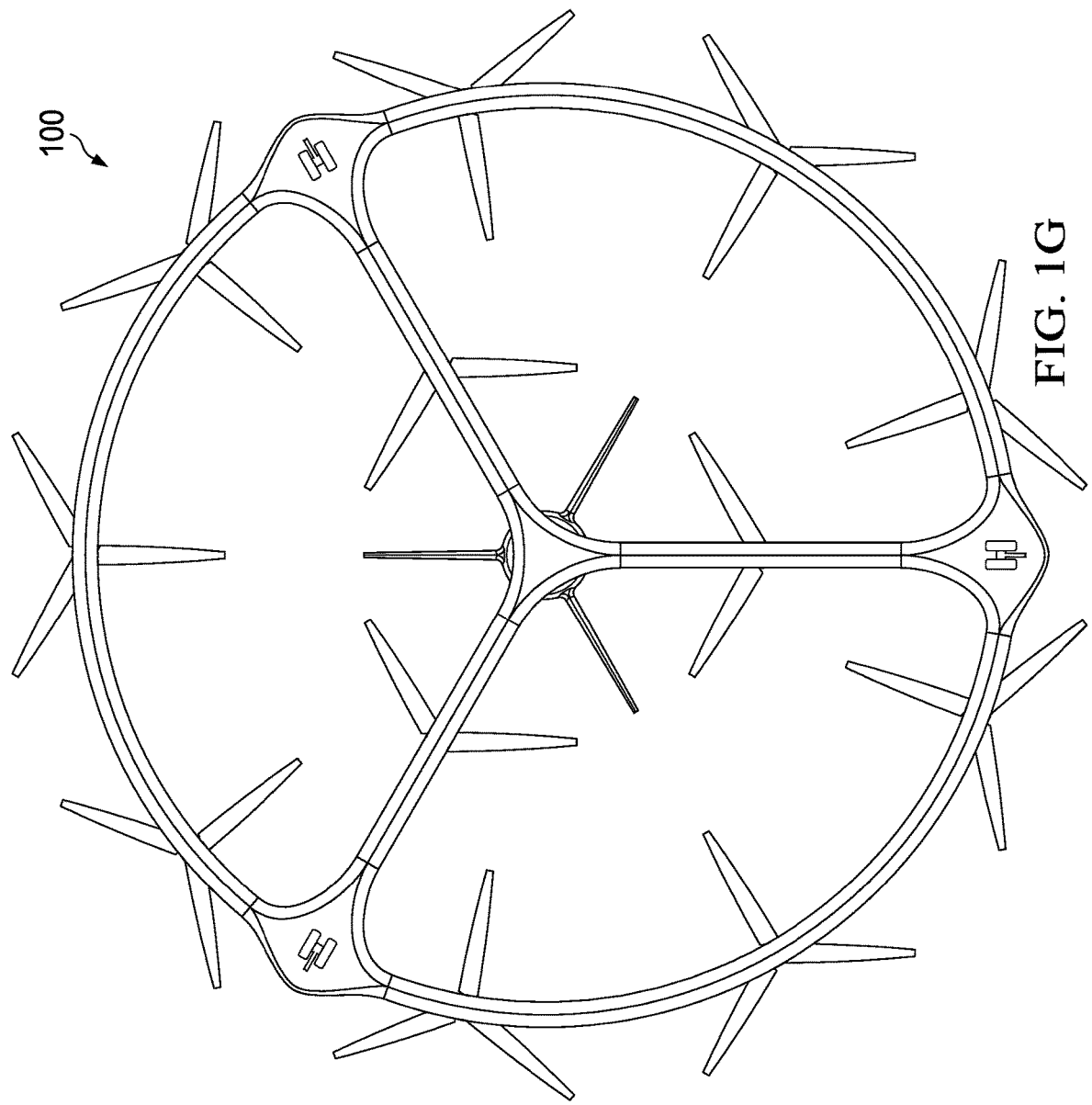
FIG. 1G is a bottom plan view of the closed wing aircraft of FIG. 1A.

Now referring to FIGS. 1A-1J, various views of a closed wing aircraft 100 in accordance with one embodiment of the present invention are shown. More specifically, FIG. 1A is a perspective view, FIG. 1B is a front elevation view, FIG. 1C is a rear elevation view, FIG. 1D is right side elevation view, FIG. 1E is a left side elevation view, FIG. 1F is a top plan view, and FIG. 1G is a bottom plan view. This closed wing aircraft 100 features the following: 1) Tail sitter configuration provides for conversion to airplane mode without reconfiguration; 2) Circular wing optimizes propulsion, structural, aerodynamic, and center of gravity (CG) requirements; 3) Gearboxes and drive train are completely eliminated; 4) Rotor cyclic and collective controls are replaced by variable speed constant pitch propellers; and 5) Yaw in vertical flight and roll in hover mode are provided by trailing edge surfaces on the spokes connecting the closed wing to the fuselage.

The closed wing aircraft 100 utilizes the ring wing configuration to provide a symmetric matrix distribution of hydraulic or electric motor driven propellers to maximize controllability and provide safety in the event of a hydraulic or electric motor failure. The ring wing also reduces the effects of cross winds during takeoff and landing by minimizing the affected wing area and eliminating induced yaw. In airplane mode flight the ring wing allows the aircraft maintain any roll position in order to position sensors as required. For noise reduction the propellers within the ring provide an acoustic barrier. Structurally, the combination of distributed propulsion and the ring wing minimizes bending moments allowing for lighter and stiffer structure compared with distributed propulsion on straight wings. Engines or fuel/batteries can be housed in the base of the fuselage or at the intersection of the spokes to the ring wing for strength and minimization of weight. Landing gear is positioned at these points for similar reasons.

More specifically, the aircraft 100 can be manned or unmanned and is capable of vertical takeoff and landing, stationary flight and forward flight. The aircraft 100 includes a closed wing 102, a fuselage 104 at least partially disposed within a perimeter of the closed wing 102, and one or more spokes 106 coupling the closed wing 102 to the fuselage 104. The closed wing 102 can be circular-shaped, oval-shaped (FIG. 1H), triangular-shaped (FIG. 1I), polygonal-shaped (FIG. 1J) or any other shape suitable for the desired operational and aerodynamic requirements of the aircraft 100. In addition, the closed wing can be made up of a plurality of wing segments 102a, 102b, 102c and wing-spoke intersections or junctions 108a, 108b, 108c connected together. The cross-sectional profile of the closed wing 102 between the leading edge 110 and trailing edge 112 can be a symmetrical airfoil or any desirable aerodynamic shape. The number of spokes 106 can be determined, in part, by the shape and size of the closed wing 102, and the shape, size and payload of the fuselage 104. The cross-sectional profile of the spokes 106 between the leading edge 114 and the trailing edge 116 can be a symmetrical airfoil or any desirable aerodynamic shape. The closed wing 102, the fuselage 104 and the one or more spokes 106 are preferably symmetrically shaped to provide transition between vertical takeoff and landing, stationary flight and forward flight in any direction. However, non-symmetrical shapes can be used. As a result, the shape of the closed wing 102 and number of spokes 106 shown in the figures is only one example and is not intended to limit the scope of the invention. The closed wing 102 may also include one or more doors or removable sections that provide access to the fuselage 104 when the aircraft 100 is in a landed position.

The fuselage 104 may include one or more sections or modules that have a longitudinal axis 117 substantially parallel to a rotational axis 118 of the propellers 120. The shape and length of the fuselage 104 will vary depending on the desired mission and flight characteristics. As a result, the shape and length of the fuselage 104 shown in the figures is only one example and is not intended to limit the scope of the invention. For example, the fuselage 104 may include a rear section or module 122 substantially disposed at a center of the closed wing 102 that provides a fuselage-spoke intersection or junction, a middle section or module 124 connected to the rear section or module 122, a front section or module 126 connected to the middle module 124, and a nose section or module 128 connected to the front section or module 126. Sections or modules 122, 124, 126, 128 can be removably connected to one another, which makes the aircraft 100 configurable for any desired mission or function. In other words, the closed wing 102 and one or more spokes 106 provide a stable flight platform any desired payload. Moreover, the middle 124, front 126 and nose 128 sections or modules can detach, pivot, or retract at least partially into one or more of the other sections or modules for storage or transport of the aircraft 100. The rear 122, middle 124, front 126 and nose 128 sections or modules can be individually configured to be a cockpit module, a cabin module, an escape module, a payload module, a sensor module, a surveillance module, a power source module, a fuel module, or any combination thereof. Note that the nose section or module 128 may contain one or more parachutes.

The aircraft 100 also includes three or more landing gear, pads or skids 130 operably attached to the closed wing 102. Typically, the landing gear, pads or skids 130 will be disposed proximate to the wing-spoke intersections or junctions 108a, 108b, 108c where there is more structural support. The landing gear, pads or skids 130 can be retractable.

One or more engines or motors 132 are disposed within or attached to the closed wing 102, fuselage 104 or spokes 106 in a distributed configuration. Three or more propellers 120 are proximate to the leading edge 110 of the closed wing 102 or the leading edge 114 of the one or more spokes 106, distributed along the closed wing 102 or the one or more spokes 106, and operably connected to the one or more engines or motors 132. In the embodiment shown, nine propellers 120 are disposed proximate to the closed wing 102, and one propeller 120 is disposed proximate to each spoke 106. The propellers 120 can be variable speed constant pitch propellers or other type of propeller. The distribution and number of propellers 120 are designed to provide stability during the failure of one or more propellers 120, or engines or motors 132.

In one embodiment, a source of hydraulic or electric power is disposed within or attached to the closed wing 102, fuselage 104 or spokes 106 and coupled to each of the of hydraulic or electric motors 132 disposed within or attached to the closed wing 102, fuselage 104 or spokes 106. The source of hydraulic or electric power provides sufficient energy density for the aircraft to attain and maintain operations of the aircraft 100. The source of hydraulic or electric power can be one or more batteries, a piston engine, or a turboshaft engine. A controller is coupled to each of the hydraulic or electric motors 132, and one or more processors are communicably coupled to each controller that control an operation and speed of the plurality of hydraulic or electric motors 132. Note that a single source of hydraulic or electric power can drive multiple hydraulic or electric motors 132. For example, a source of hydraulic or electric power can be located in the wing-spoke intersections or junctions 108a, 108b, 108c or the rear fuselage 122 where there is more structural support. Hydraulic or electric power distribution systems can be used to transmit the power to the hydraulic or electric motors 132, which in turn drive the propellers 120. The hydraulic or electric motors 132 are selected based on at least one of aerodynamics, propulsive efficiency, structural efficiency, aeroelasticity, or weight of the aircraft. Moreover, the propellers 120, or the engines or motors 132 can be mounted to pivot to provide directional thrust. Similarly, additional thrusters can be disposed on the closed wing 102, fuselage 104 or spokes 106. Various examples of distributed power systems are shown in FIGS. 2-5.

Figure 2:
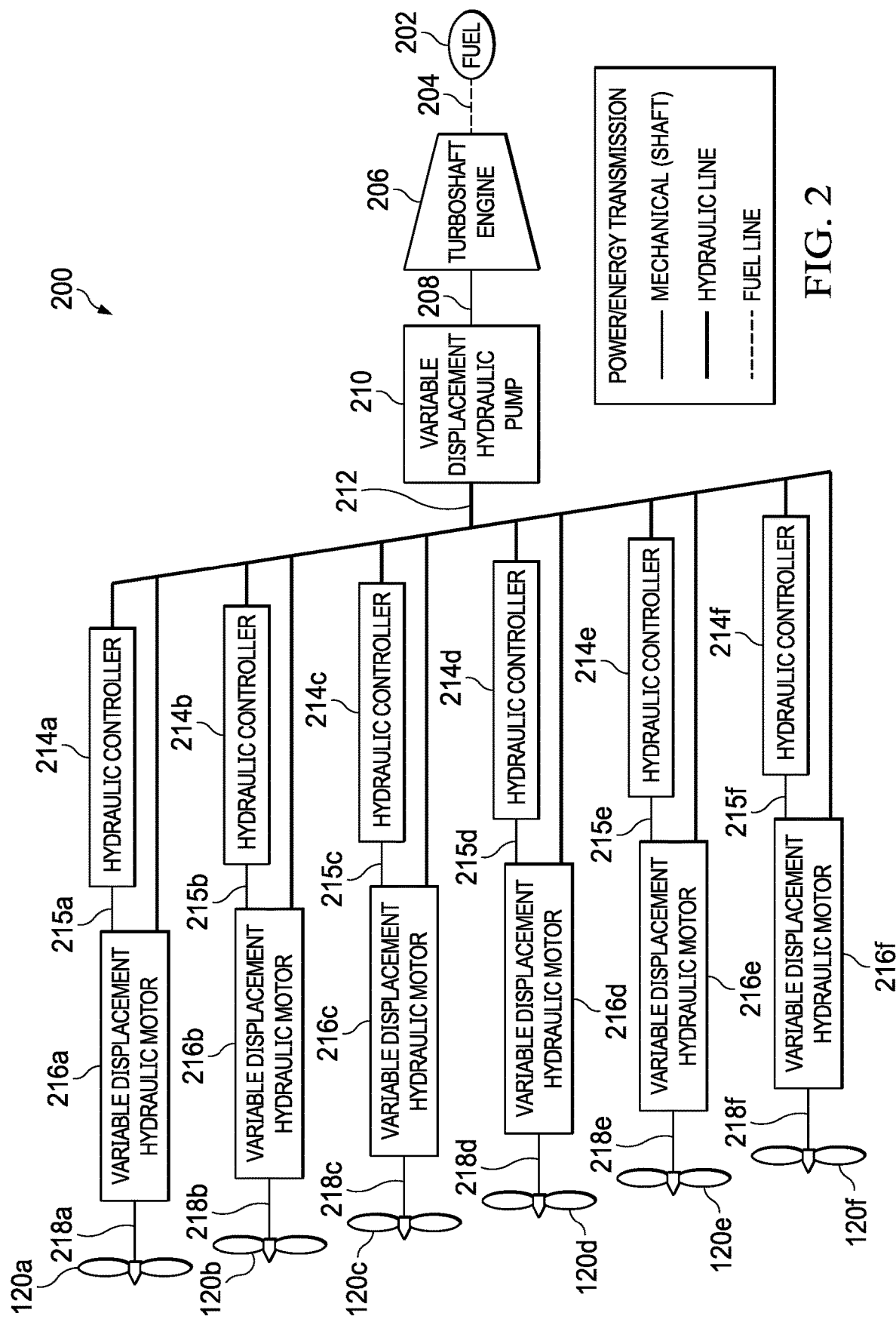
FIG. 2 shows a schematic of a hybrid turboshaft engine hydraulic distributed propulsion system in accordance with one embodiment of the present invention.

Referring now to FIG. 2, a schematic of a hybrid turboshaft engine hydraulic distributed propulsion system 200 in accordance with one embodiment of the present invention is shown. In the hybrid turboshaft engine hydraulic distributed propulsion system 200, a source of fuel 202 is connected to a fuel line 204 that feeds a turboshaft engine 206 that generates a mechanical force that is transmitted by a mechanical shaft 208 that is connected to a variable displacement hydraulic pump 210. The variable displacement hydraulic pump 210 is connected to, and provides hydraulic power to, hydraulic lines 212. The hydraulic fluid in hydraulic lines 212 is connected to hydraulic controllers 214a-214f, which are connected mechanically by mechanical shafts 215a-215f to the variable displacement hydraulic motors 216a-216f, respectively, each of which is depicted being connected by mechanical shafts 218a-218f to propellers 120a-120f, respectively. Changing the displacement of the variable displacement hydraulic motors 216a-216f can control the speed and torque of the variable displacement hydraulic motors 216a-216f. The variable displacement hydraulic motors 216a-216f can be self-cooling. This schematic shows the Hybrid Turboshaft Engine Hydraulic distributed propulsion system 200 as having six (6) hydraulic controllers 214a-214f, and six (6) variable displacement hydraulic motors 216a-216f. However, the skilled artisan will recognize that the present invention can include a smaller or larger number of variable displacement hydraulic motors and propellers, for example 4, 5, 6, 7, 8, 9, 10, 11, 12, 13, 14, 15, 16, 17, 18, 19, 20, 21, 22, 23, 24, 25 or more. In this embodiment, the fuel is converted into mechanical power/energy via the turboshaft engine 206, which provides the hydraulic power that drives the variable displacement hydraulic motors 216a-216f and therefore the propellers 120a-120f.

Figure 3:
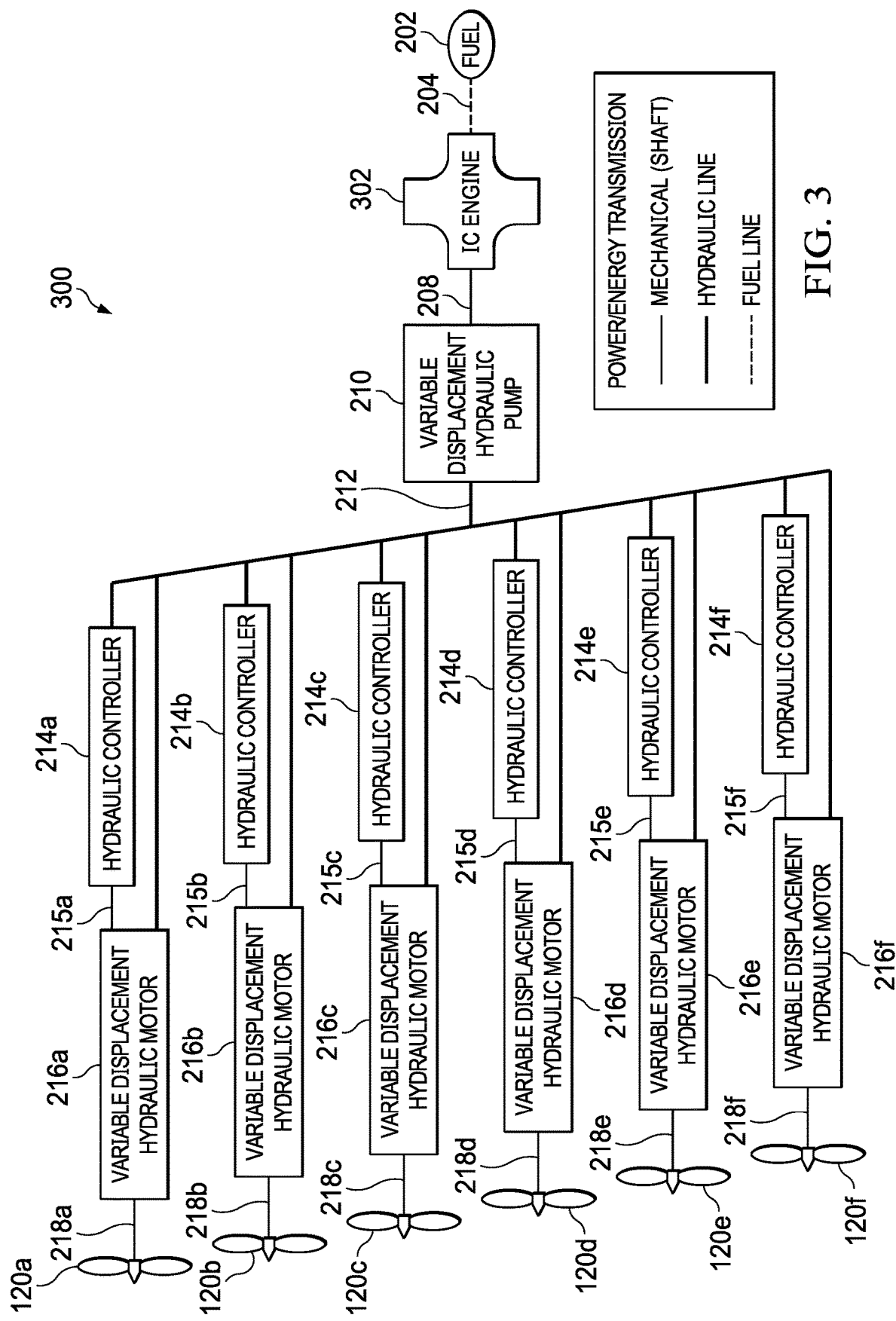
FIG. 3 shows a schematic of a hybrid internal combustion engine-engine hydraulic distributed propulsion system in accordance with one embodiment of the present invention.

Now referring to FIG. 3, a schematic of a hybrid internal combustion engine-engine hydraulic distributed propulsion system 300 in accordance with one embodiment of the present invention is shown. In this embodiment, the hybrid internal combustion engine-engine hydraulic distributed propulsion system 300 uses a source of fuel 202 that is connected to fuel line 204 that feeds an internal combustion engine 302 that generates a mechanical force that is transmitted by a mechanical shaft 208 that is connected to a variable displacement hydraulic pump 210. The variable displacement hydraulic pump 210 is connected to, and provides hydraulic power to, hydraulic lines 212. The hydraulic fluid in hydraulic lines 212 is connected to hydraulic controllers 214a-214f, which are connected mechanically by mechanical shafts 215a-215f to the variable displacement hydraulic motors 216a-216f, respectively, each of which is depicted being connected by mechanical shafts 218a-218f to propellers 120a-120f, respectively. Changing the displacement of the variable displacement hydraulic motors 216a-216f can control the speed and torque of the variable displacement hydraulic motors 216a-216f. The variable displacement hydraulic motors 216a-216f can be self-cooling. This schematic shows the Hybrid Internal Combustion Engine-Engine Hydraulic distributed propulsion system 300 as having six (6) hydraulic controllers 214a-214f, and six (6) variable displacement hydraulic motors 216a-216f. However, the skilled artisan will recognize that the present invention can include a smaller or larger number of variable displacement hydraulic motors and propellers, for example 4, 5, 6, 7, 8, 9, 10, 11, 12, 13, 14, 15, 16, 17, 18, 19, 20, 21, 22, 23, 24, 25 or more. In this embodiment, the fuel is converted into mechanical power/energy via the internal combustion engine 302, which provides the hydraulic power that drives the variable displacement hydraulic motors 216a-216f and therefore the propellers 218a-218f.

Figure 4:
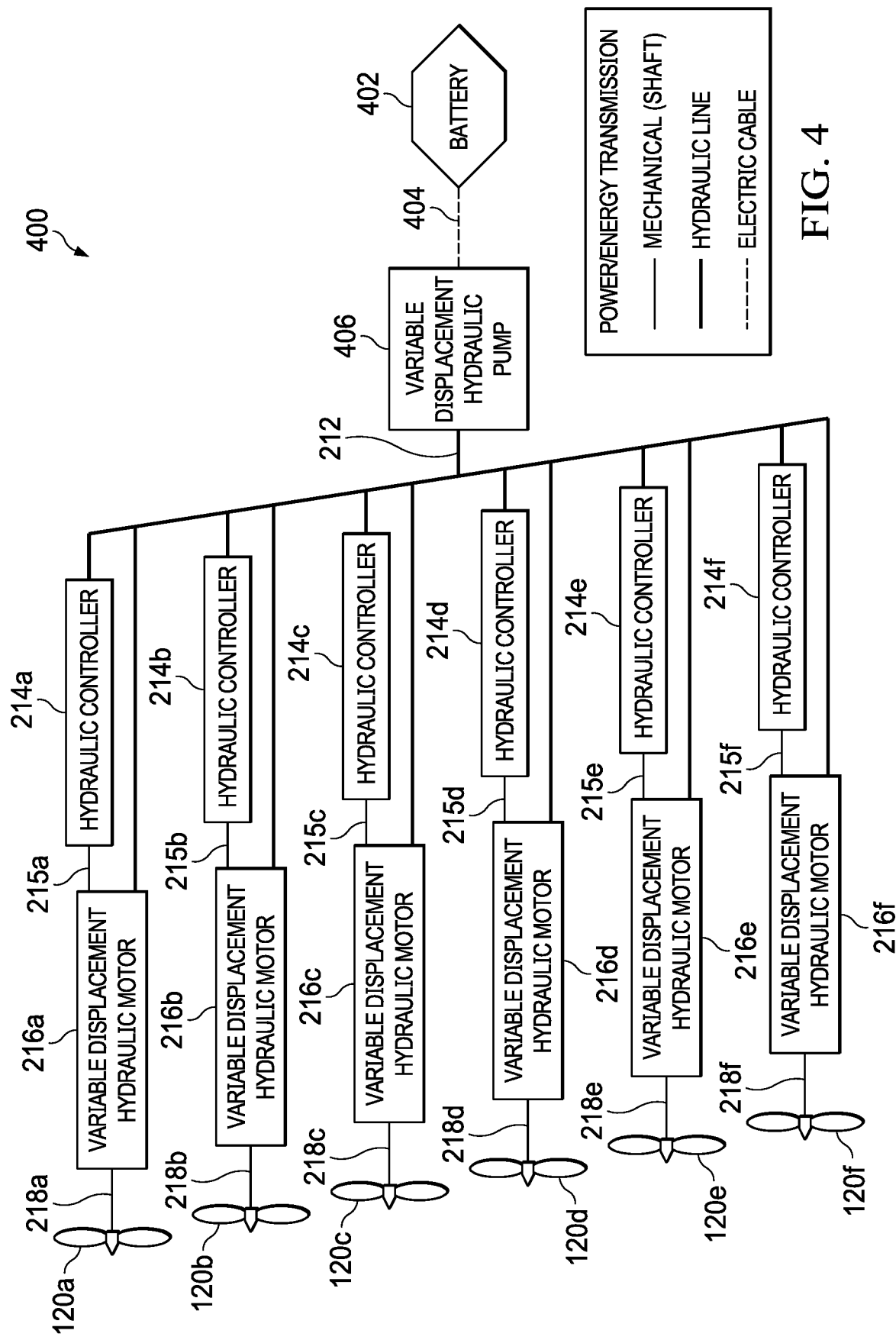
FIG. 4 shows a schematic of a hybrid electric hydraulic distributed propulsion system in accordance with one embodiment of the present invention.

Referring now to FIG. 4, a schematic of a hybrid electric hydraulic distributed propulsion system 400 in accordance with one embodiment of the present invention is shown. In this embodiment, the hybrid electric hydraulic distributed propulsion system 400 uses one or more batteries 402 that are connected to electrical cable 404 that directly powers a variable displacement hydraulic motor pump 406. The variable displacement hydraulic motor pump 406 is connected to, and provides hydraulic power to, hydraulic lines 212. The hydraulic fluid in hydraulic lines 212 is connected to hydraulic controllers 214a-214f, which are connected mechanically by mechanical shafts 215a-215f to the variable displacement hydraulic motors 216a-216f, respectively, each of which is depicted being connected by mechanical shafts 218a-218f to propellers 120a-120f, respectively. Changing the displacement of the variable displacement hydraulic motors 216a-216f can control the speed and torque of the variable displacement hydraulic motors 216a-216f. The variable displacement hydraulic motors 216a-216f can be self-cooling. This schematic shows the Hybrid Internal Combustion Engine-Engine Hydraulic distributed propulsion system 400 as having six (6) hydraulic controllers 214a-214f, and six (6) variable displacement hydraulic motors 216a-216f. However, the skilled artisan will recognize that the present invention can include a smaller or larger number of variable displacement hydraulic motors and propellers, for example 4, 5, 6, 7, 8, 9, 10, 11, 12, 13, 14, 15, 16, 17, 18, 19, 20, 21, 22, 23, 24, 25 or more. In this embodiment, the electrical power is converted into mechanical power/energy via the variable displacement hydraulic motor pump 406, which provides the hydraulic power that drives the variable displacement hydraulic motors 216a-216f and therefore the propellers 218a-218f.

Figure 5:
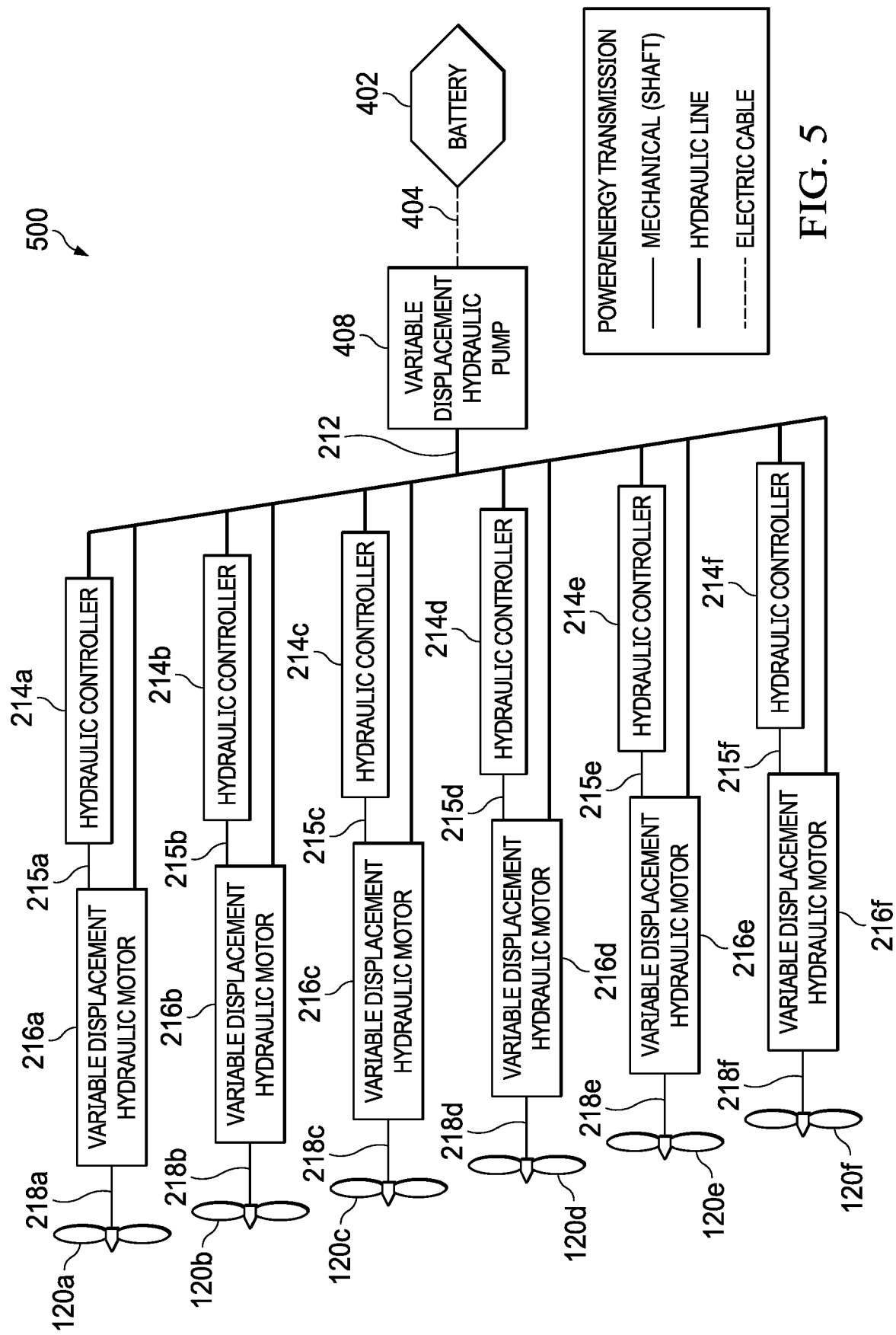
FIG. 5 shows a schematic of a hybrid electric hydraulic with a piezo-electric pump distributed propulsion system in accordance with one embodiment of the present invention.

Now referring to FIG. 5, a schematic of a hybrid electric hydraulic with a piezo-electric pump distributed propulsion system 500 in accordance with one embodiment of the present invention is shown. In this embodiment, the hybrid electric hydraulic with a piezo-electric pump distributed propulsion system 500 uses one or more batteries 402 that are connected to electrical cable 404 that directly powers a piezo-hydraulic pump 408. The piezo-hydraulic pump 408 is connected to, and provides hydraulic power to, hydraulic lines 212. The hydraulic fluid in hydraulic lines 212 is connected to hydraulic controllers 214a-214f, which are connected mechanically by mechanical shafts 215a-215f to the variable displacement hydraulic motors 216a-216f, respectively, each of which is depicted being connected by mechanical shafts 218a-218f to propellers 120a-120f, respectively. Changing the displacement of the variable displacement hydraulic motors 216a-216f can control the speed and torque of the variable displacement hydraulic motors 216a-216f. The variable displacement hydraulic motors 216a-216f can be self-cooling. This schematic shows the Hybrid Internal Combustion Engine-Engine Hydraulic distributed propulsion system 500 as having six (6) hydraulic controllers 214a-214f, and six (6) variable displacement hydraulic motors 216a-216f. However, the skilled artisan will recognize that the present invention can include a smaller or larger number of variable displacement hydraulic motors and propellers, for example 4, 5, 6, 7, 8, 9, 10, 11, 12, 13, 14, 15, 16, 17, 18, 19, 20, 21, 22, 23, 24, 25 or more. In this embodiment, the electrical power is converted into mechanical power/energy via the piezo-hydraulic pump 408, which provides the hydraulic power that drives the variable displacement hydraulic motors 216a-216f and therefore the propellers 218a-218f.

Some of the benefits of the distributed hydraulic system of the present invention, in conjunction with electric propulsion, can be attained by the present invention, for aircraft of all sizes. For example, for use with Vertical Take-Off and Landing (VTOL) aircraft the advantages of the present invention include: (1) a reduction in aircraft propulsion installation weight through greater structural integration; (2) the elimination of (rotor cyclic) control through differential and vectoring thrust for pitch, roll, and yaw moments; (3) high production rates and easy replacement of motors or propulsors that are small and light; (4) in the case of turbine/IC engine electric power generation, reduced fuel consumption and emissions through independent control of engine and rotor speeds; and (5) using electric batteries provided for more efficient energy usage, reduced emissions, and lower noise.

Further advantages of the present invention include addressing certain road blocks to distributed electric propulsion for larger VTOL aircraft. The present invention provides one or more of the following benefits: (1) the elimination of electric motor and required controller power densities are low at required power levels (excessive weight); (2) eliminate electric motor torque capacity that is inadequate for speed changes required for thrust vectoring of larger rotors; (3) with increased power, electric motors require large diameters with ducted air or liquid cooling to prevent over heating (increased weight/envelope/complexity); (4) with increased power electric motor bearings require active lubrication (increased weight/complexity); and (5) current battery technology energy density insufficient for practical applications due to excessive weight.

Figure 6A:
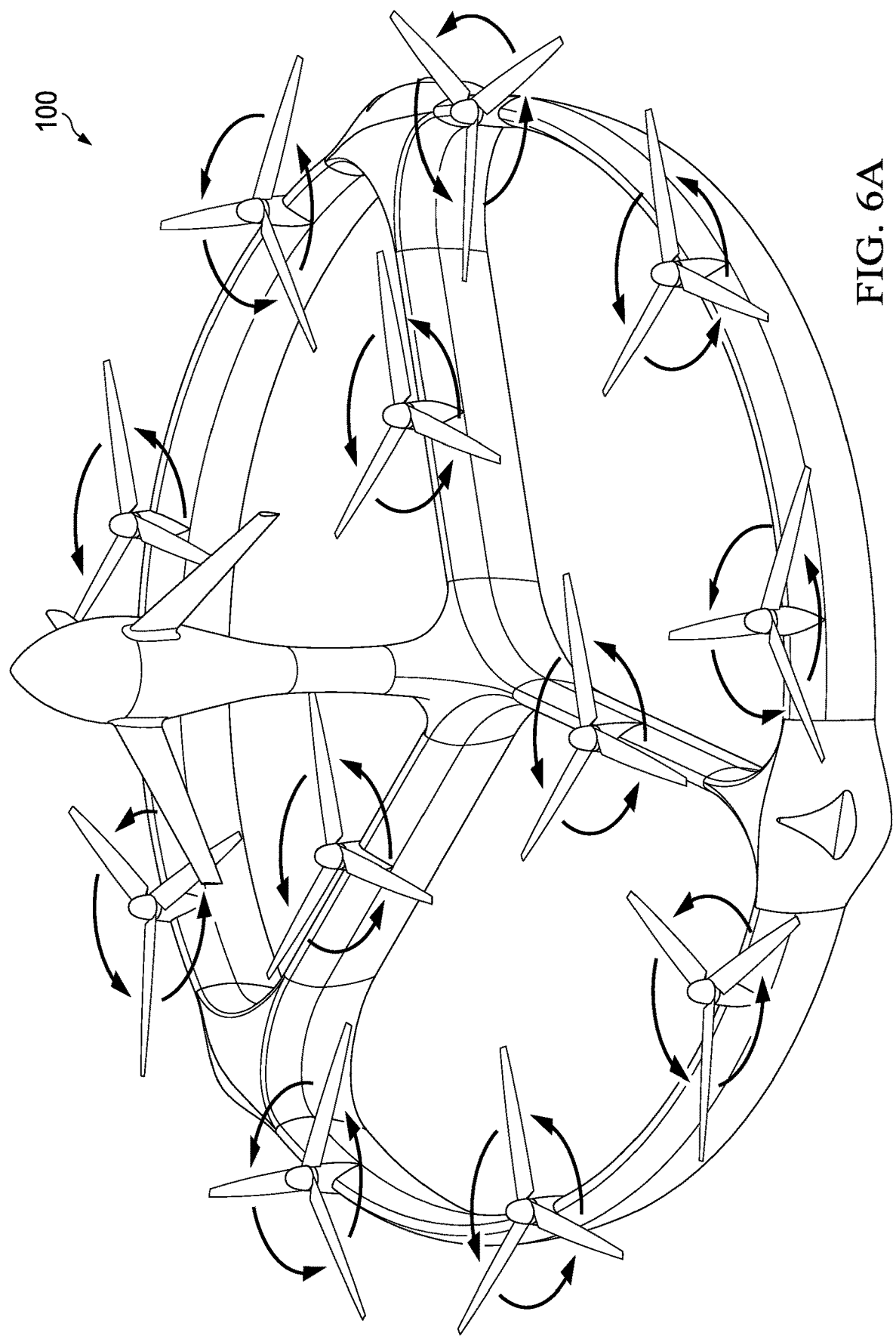
FIG. 6A depicts the closed wing aircraft of FIG. 1A in stationary flight (hover mode including vertical takeoff and landing) in accordance with one embodiment of the present invention.
Figure 6B:
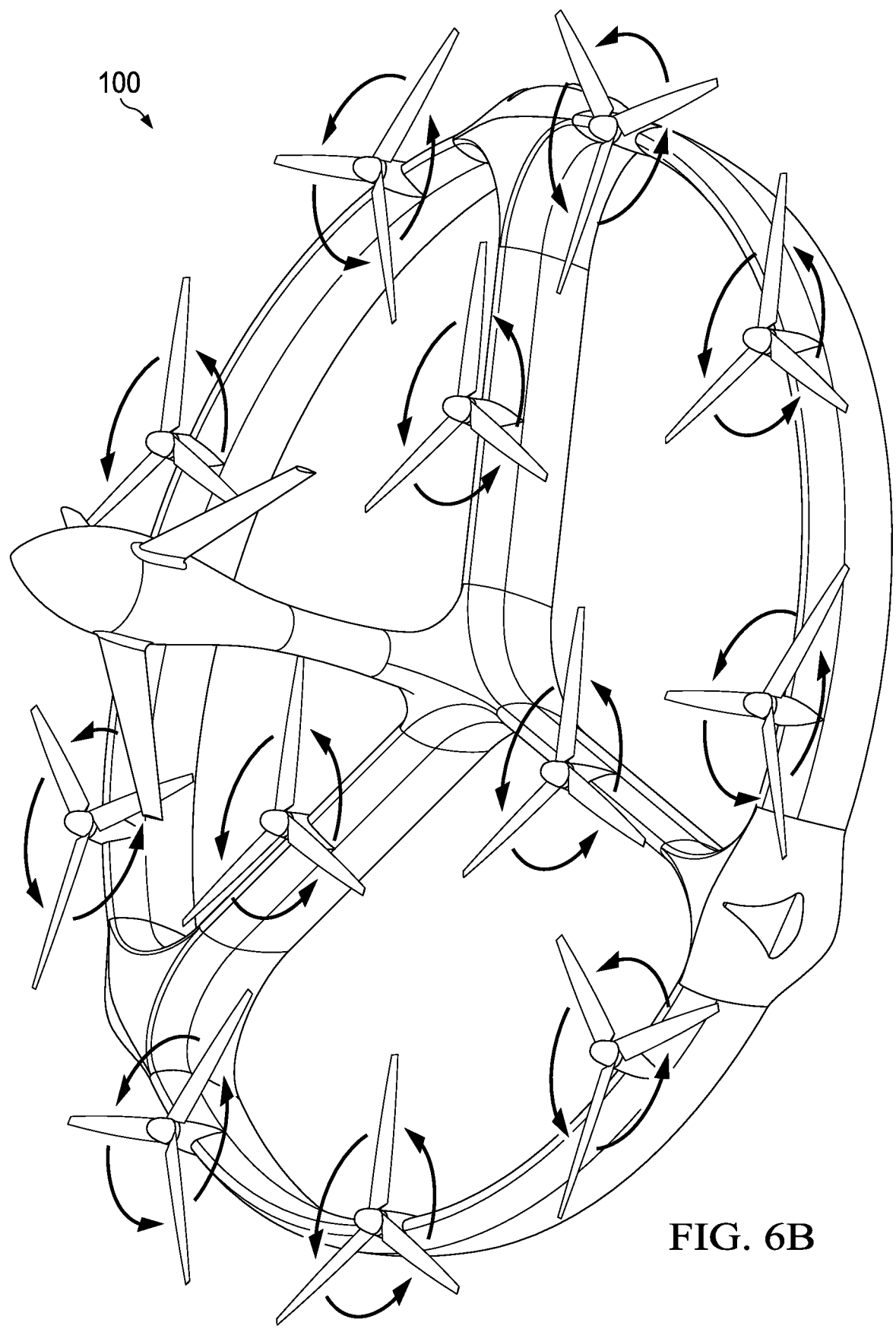
FIG. 6B depicts the closed wing aircraft of FIG. 1A in transition from stationary flight to forward flight and vice versa in accordance with one embodiment of the present invention.
Figure 6C:
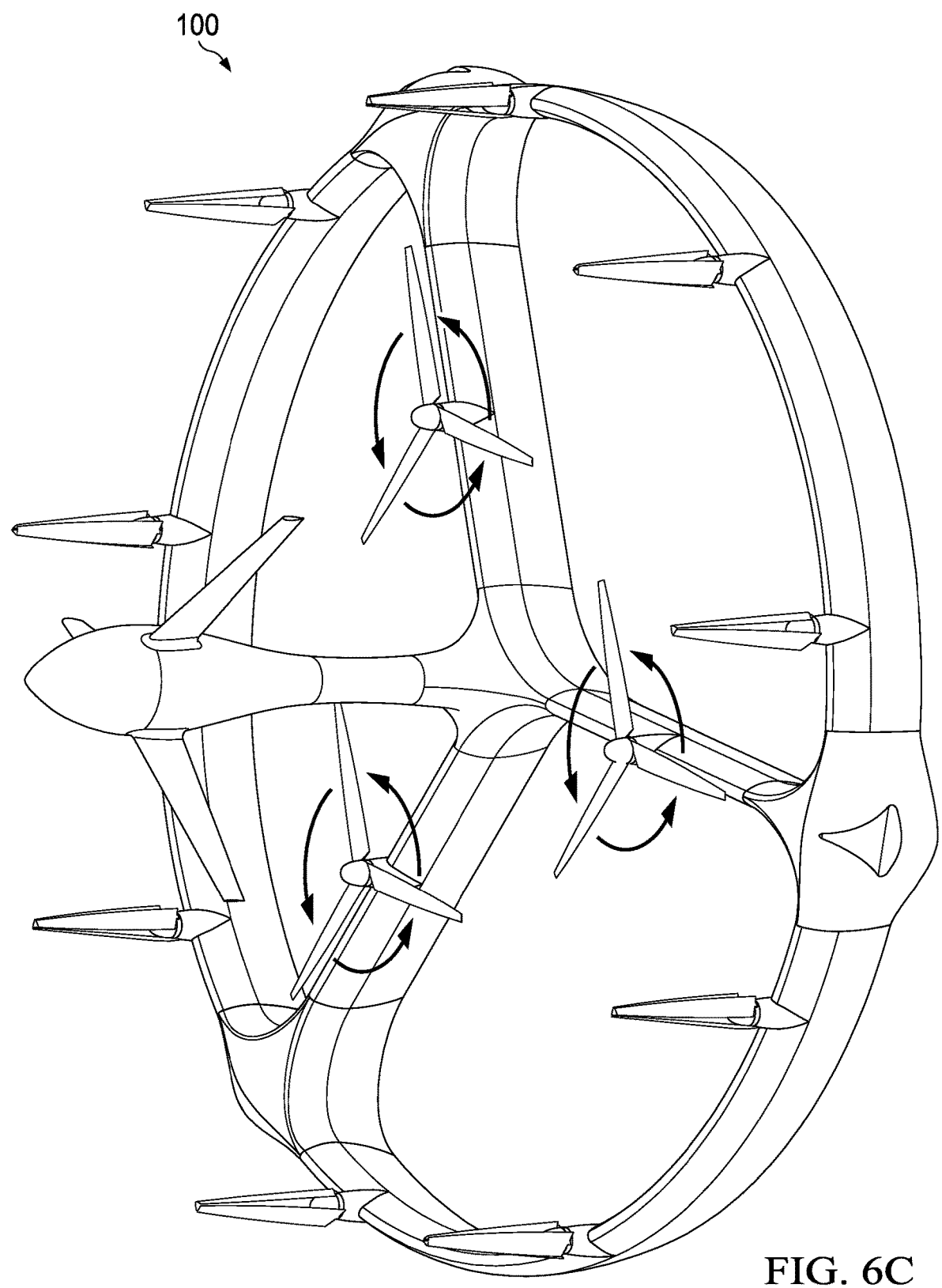
FIG. 6C depicts the closed wing aircraft of FIG. 1A in forward flight in accordance with one embodiment of the present invention
Figure 7A:
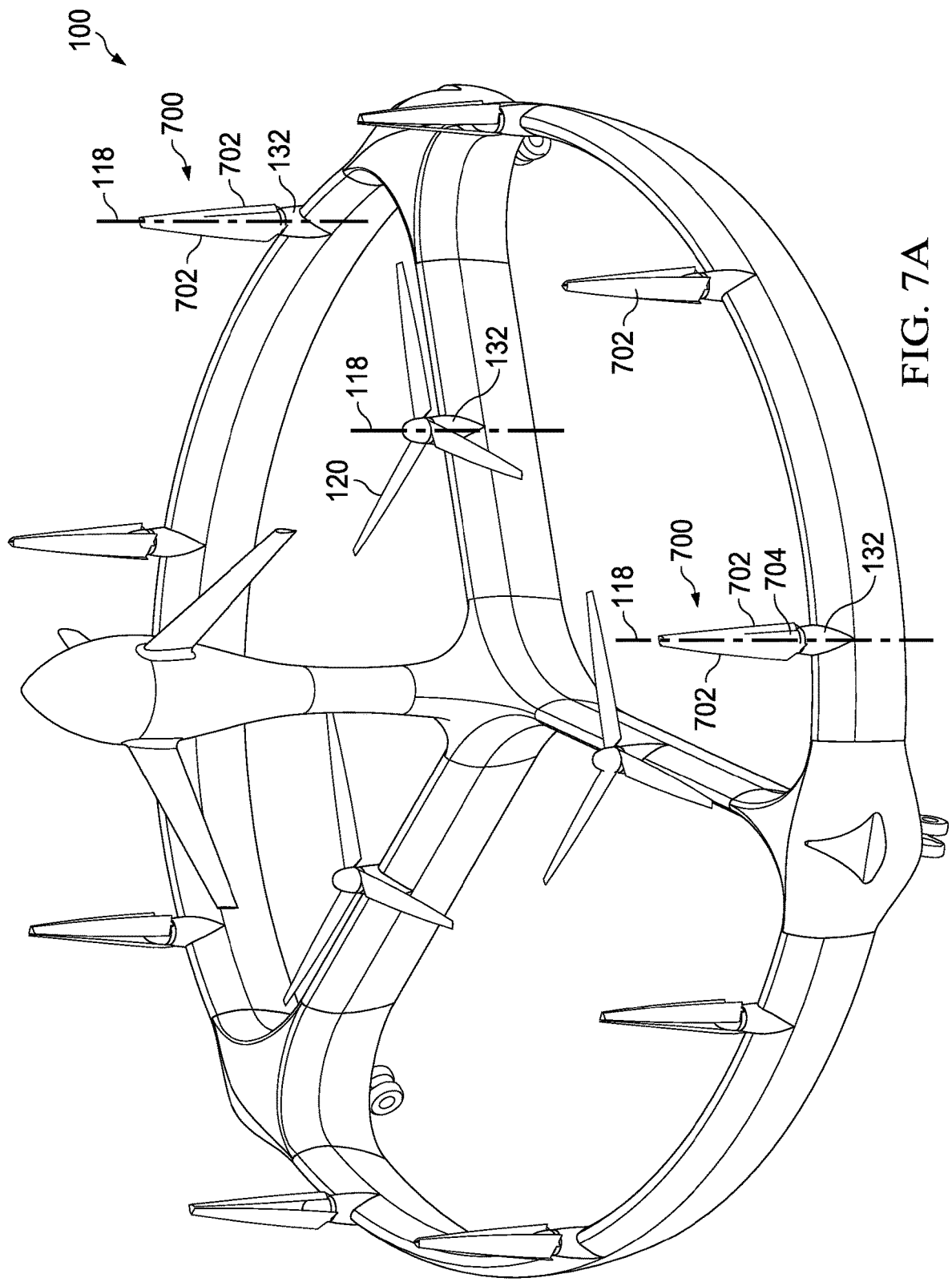
FIG. 7A is a perspective view of a closed wing aircraft in accordance with one embodiment of the present invention in which the rotors on the spokes are deployed and the rotors on the closed wing are folded forward.
Figure 7B:
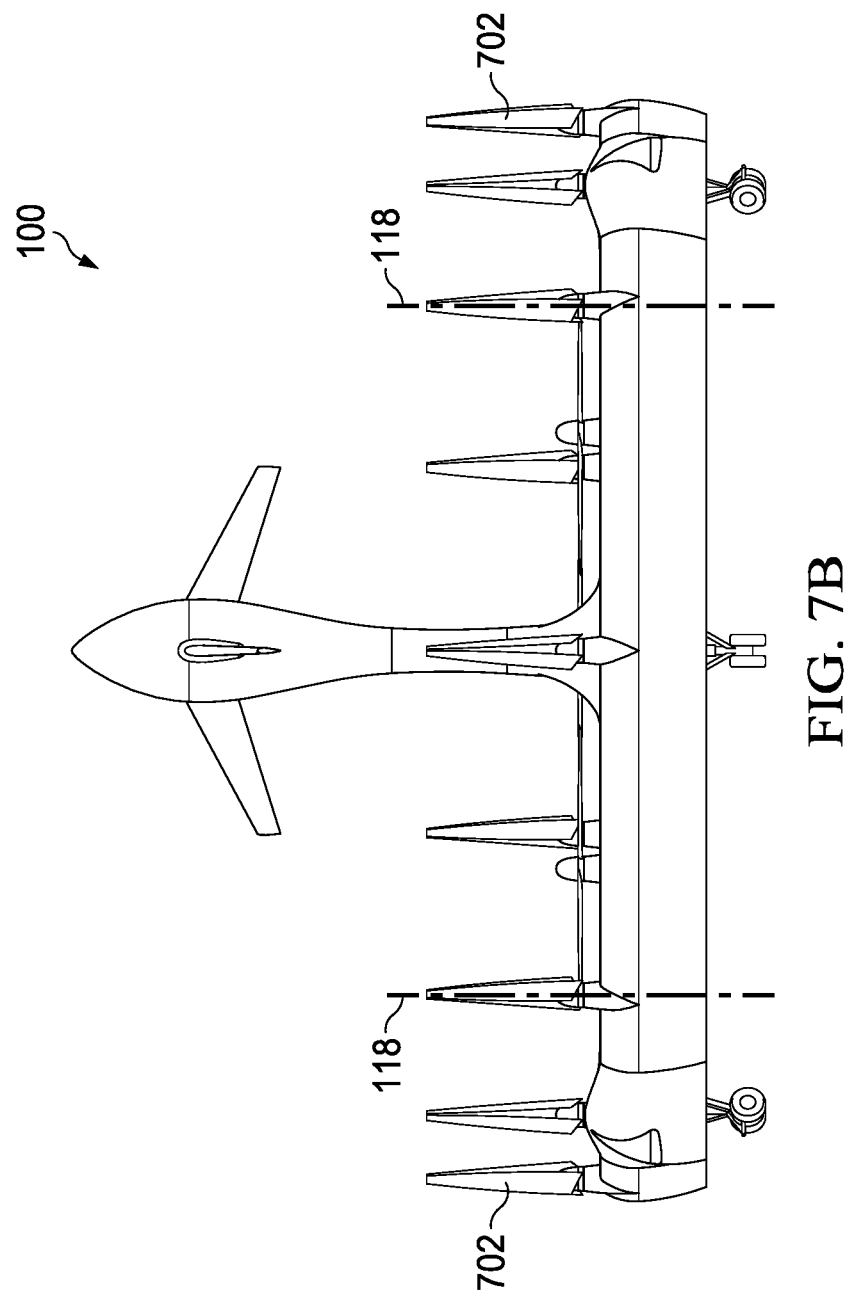
FIG. 7B is a front elevation view of the closed wing aircraft of FIG. 7A.
Figure 7C:
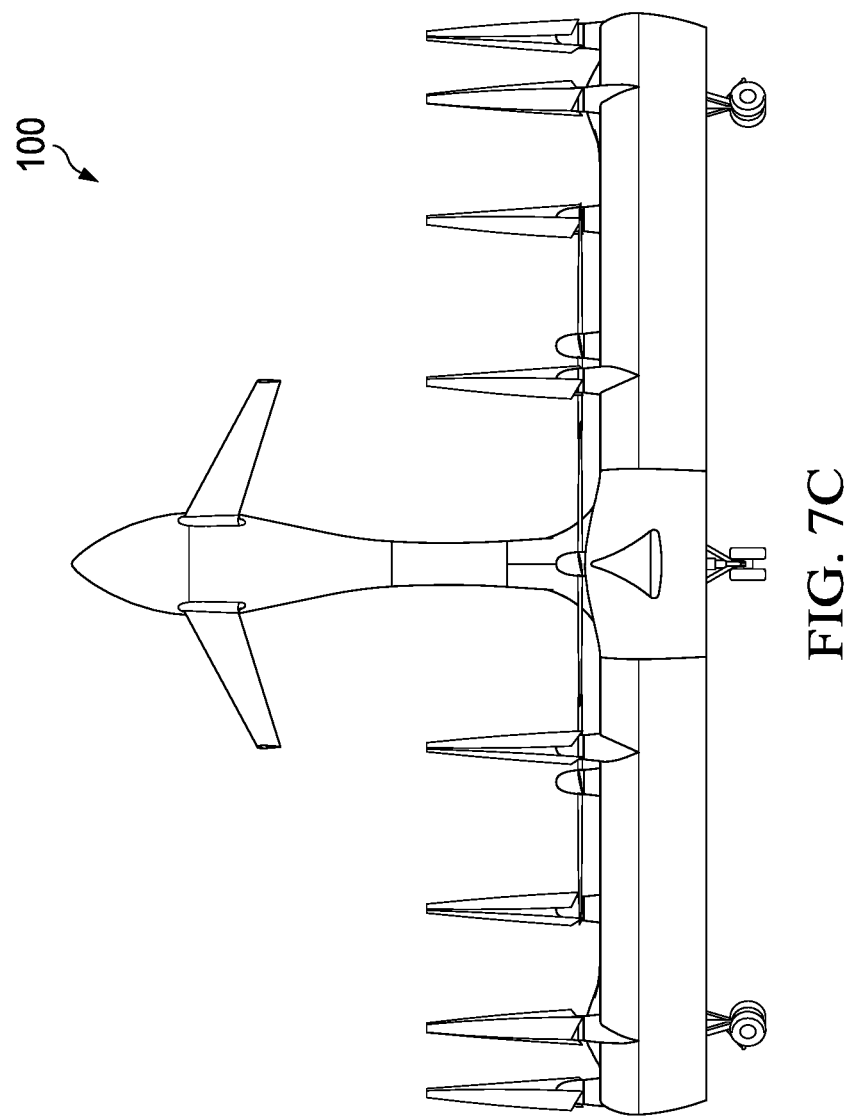
FIG. 7C is a rear elevation view of the closed wing aircraft of FIG. 7A.
Figure 7D:
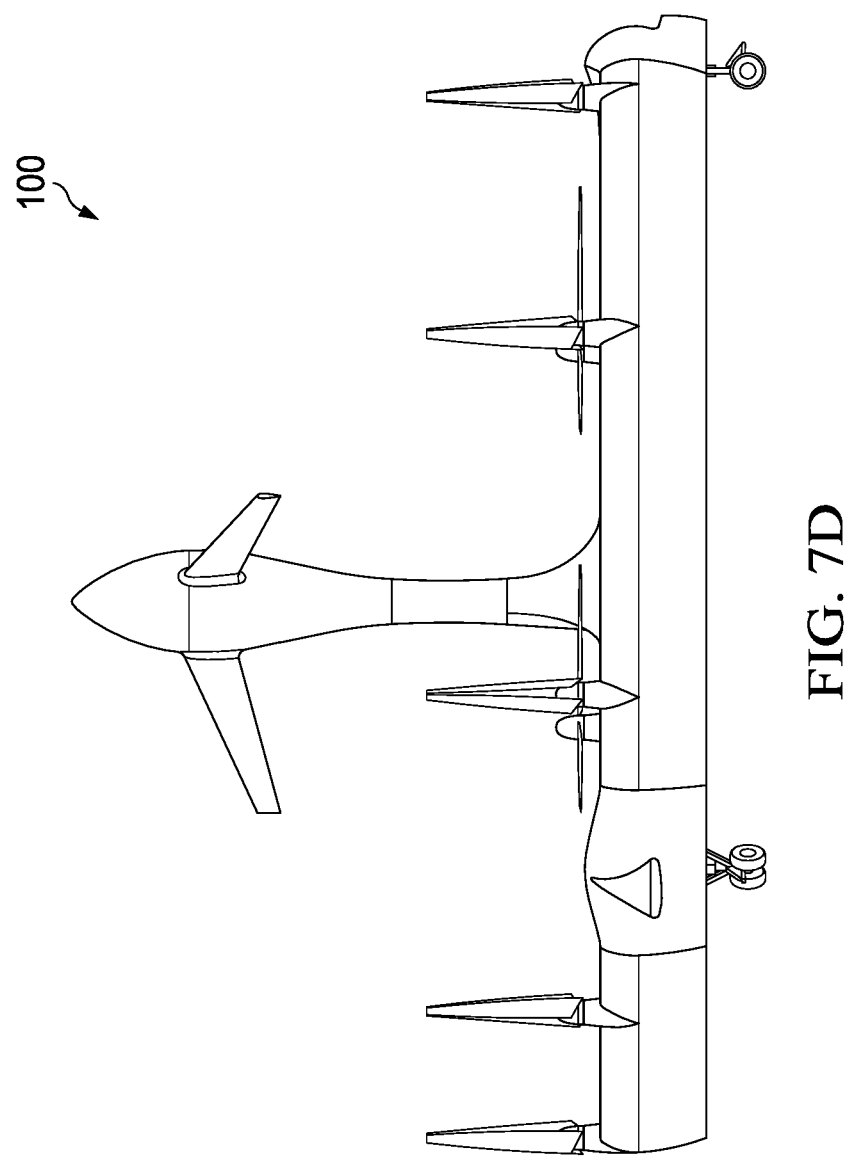
FIG. 7D is a right side elevation view of the closed wing aircraft of FIG. 7A.
Figure 7E:
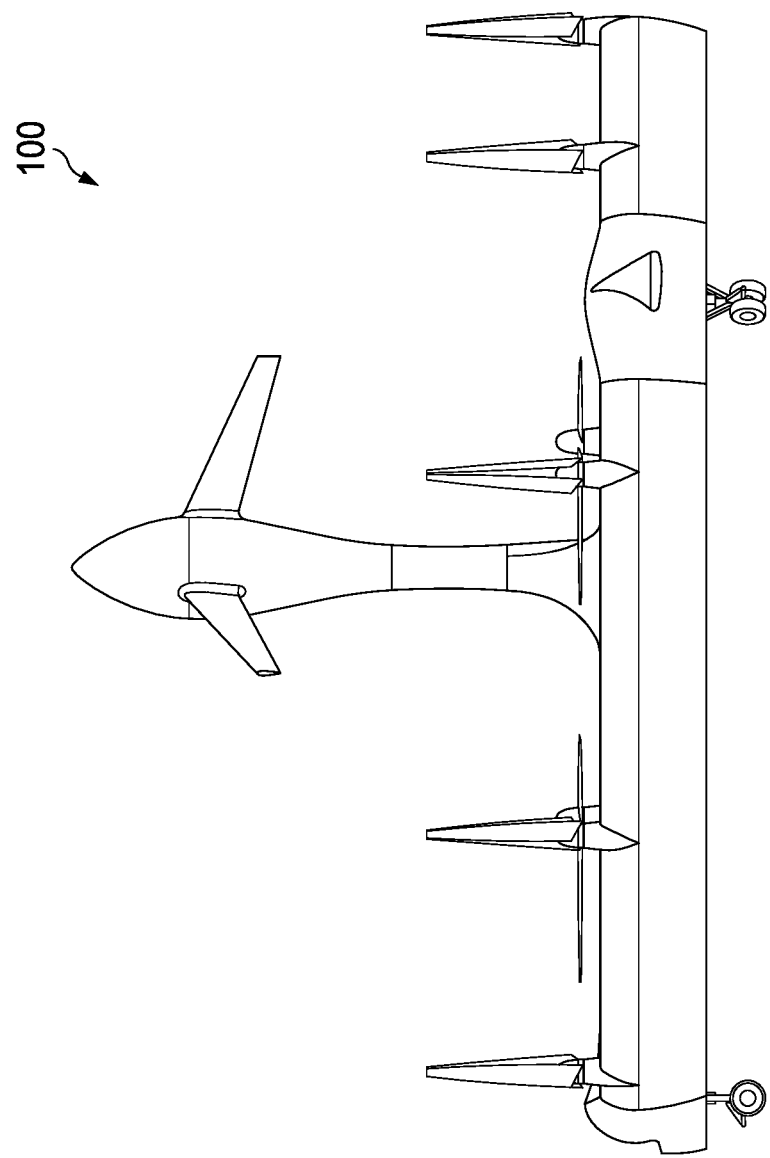
FIG. 7E is a left side elevation view of the closed wing aircraft of FIG. 7A.
Figure 7G:
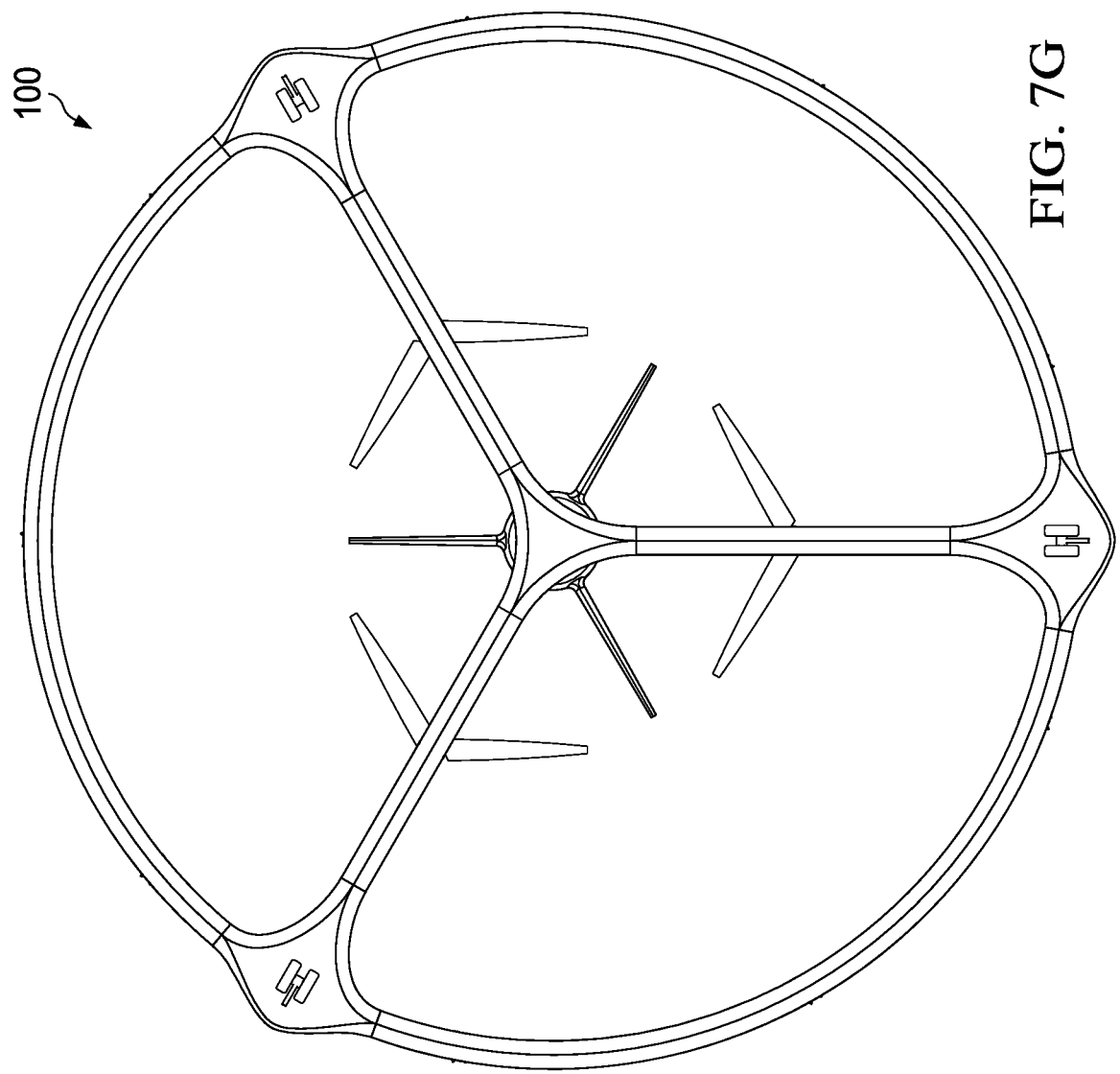
FIG. 7G is a bottom plan view of the closed wing aircraft of FIG. 7A.

Referring now to FIGS. 6A-6C, the aircraft 100 is shown in stationary flight (hover mode including vertical takeoff and landing) (FIG. 6A), transition from stationary flight to forward flight and vice versa (FIG. 6B), and forward flight (FIG. 6C). The closed wing 102 provides lift whenever the aircraft 100 is in forward flight. The three or more propellers 120 provide lift whenever the aircraft 100 is in vertical takeoff and landing and stationary flight, and provide thrust whenever the aircraft 100 is in forward flight. During forward flight, the propellers 120 can be selectively feathered or operated in a low power mode because the closed wing 102 and spokes 106 provide lift. One or more flight control surfaces are disposed on or extending from the closed wing 102, spokes 106 or the fuselage 104 to provide improved control and flight characteristics. The one or more control surfaces may include one or more air foils, winglets, elevators or ailerons. For example and as shown in FIGS. 1A-1G, winglets 134 mounted on the forward section or module 126 of the fuselage 104. Note that the one or more airfoils or winglets can be retractable, removable, stowable or variable swept.

As shown, the closed wing 102, fuselage 104 and spokes 106 are not substantially reconfigured for transition between vertical takeoff and landing, stationary flight and forward flight. However, in some embodiments it may be desirable to have the one or more spokes 106 operable to change a position of the closed wing 102 with respect to the fuselage 104 or vice versa. In other words, the spokes 106 would selectively pivot the closed wing 102 to act like a giant flap in horizontal mode and/or assist in transition to/from vertical mode.

The aircraft 100 provides a stable platform for one or more sensors or surveillance packages disposed on, disposed within or attached to the closed wing 102, spokes 106 or fuselage 104. In fact, the configuration of the aircraft 100 allows the placement of the one or more sensors or surveillance packages to provide a 360 degree view. Moreover, the extension of the fuselage 104 from the engines or motors 132 provides a wide unobstructed view for the one or more sensors or surveillance packages.

As shown in FIG. 6C and FIGS. 7A-7G, the propellers 120 can be selectively folded in a forward direction. The propellers 120 could also be folded in a backward direction. In the embodiment having the forward folding propellers 700, each propeller 700 includes two or more rotor blades 702, each rotor blade 702 in mechanical communication with a hub 704 and pivotable about an axis of rotation 118. A fold linkage mechanically couples a rotating portion of a bearing plate to the rotor blade 702. An actuator is coupled to a non-rotating portion of the bearing plate and is operable to reposition the bearing plate from a first position to a second position such that the folding links pivot the rotor blades 702 from a deployed position to a folded position. The folded position can be a forward direction, which extends past the hub 704 with the first position of the bearing plate is closer to the hub 704 than the second position of the bearing plate. A tip of all the rotors 702 can be preloaded together in the forward folded position such that a vibration of the rotors 702 is minimized.

Figure 8:
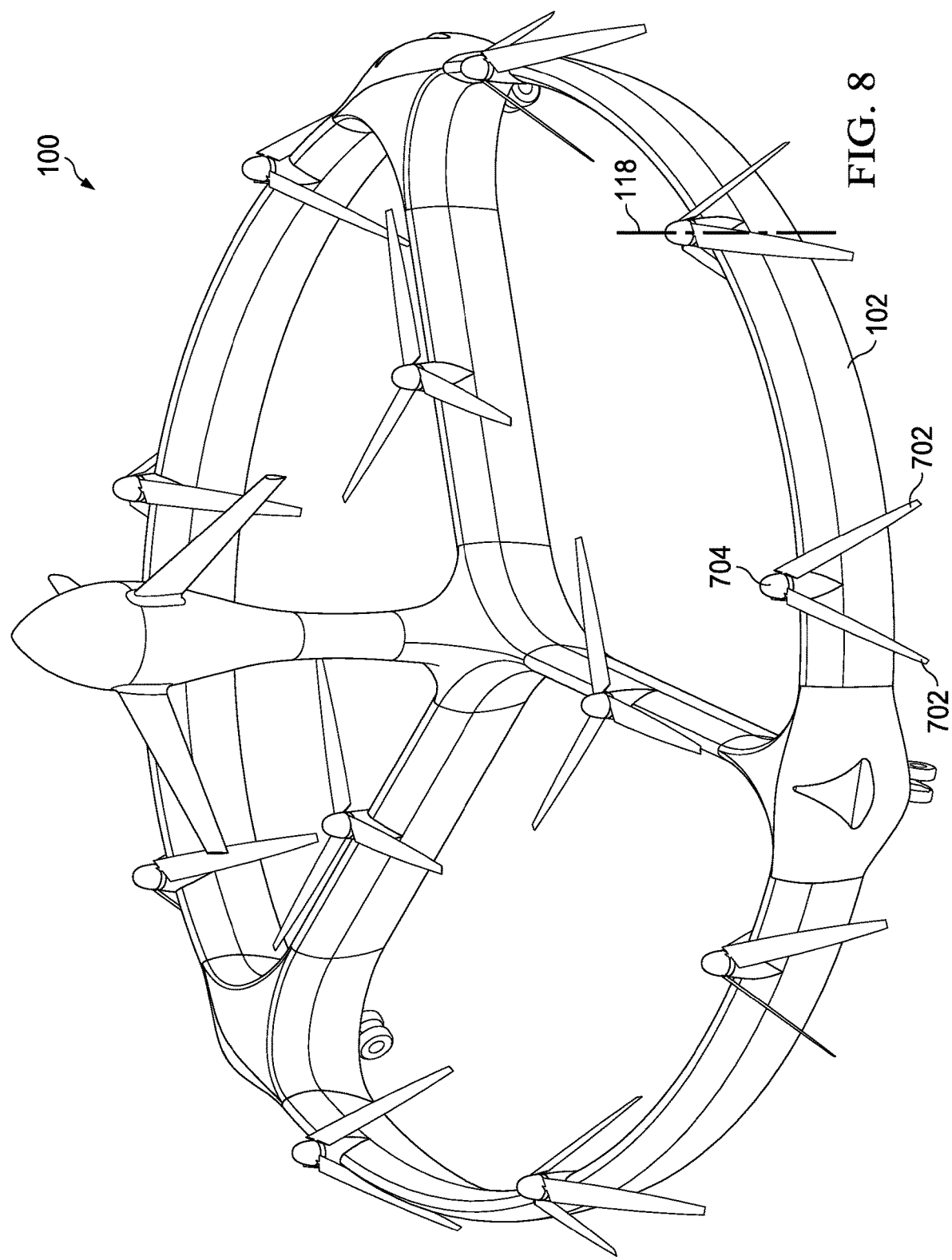
FIG. 8 is a perspective view of a closed wing aircraft in accordance with one embodiment of the present invention in which the rotors on the spokes are deployed and the rotors on the closed wing are folded backward.

Alternatively and as shown in FIG. 8, the folded position can be a backward direction, which extends away from the hub 704, and the first position of the bearing plate is closer to the hub 304 than the second position of the bearing plate. The angle or distance that the rotors 702 can fold will depend on the relative size and shape of the closed wing with respect to the pivot point and size of the rotors. For example, FIG. 8 shows the rotors 702 folded in a backward position, but not against the surface of the closed wing 102 or substantially parallel to the rotational axis 118 of the rotors 702. Some embodiments of the present invention will have the rotors 702 resting against or close to the surface of the closed wing 102 and/or substantially parallel to the rotational axis 118 of the rotors. An example of backward folding rotor blades is disclosed in U.S. Pat. No. 9,156,545 which is hereby incorporated by reference in its entirety.

Figure 9A:
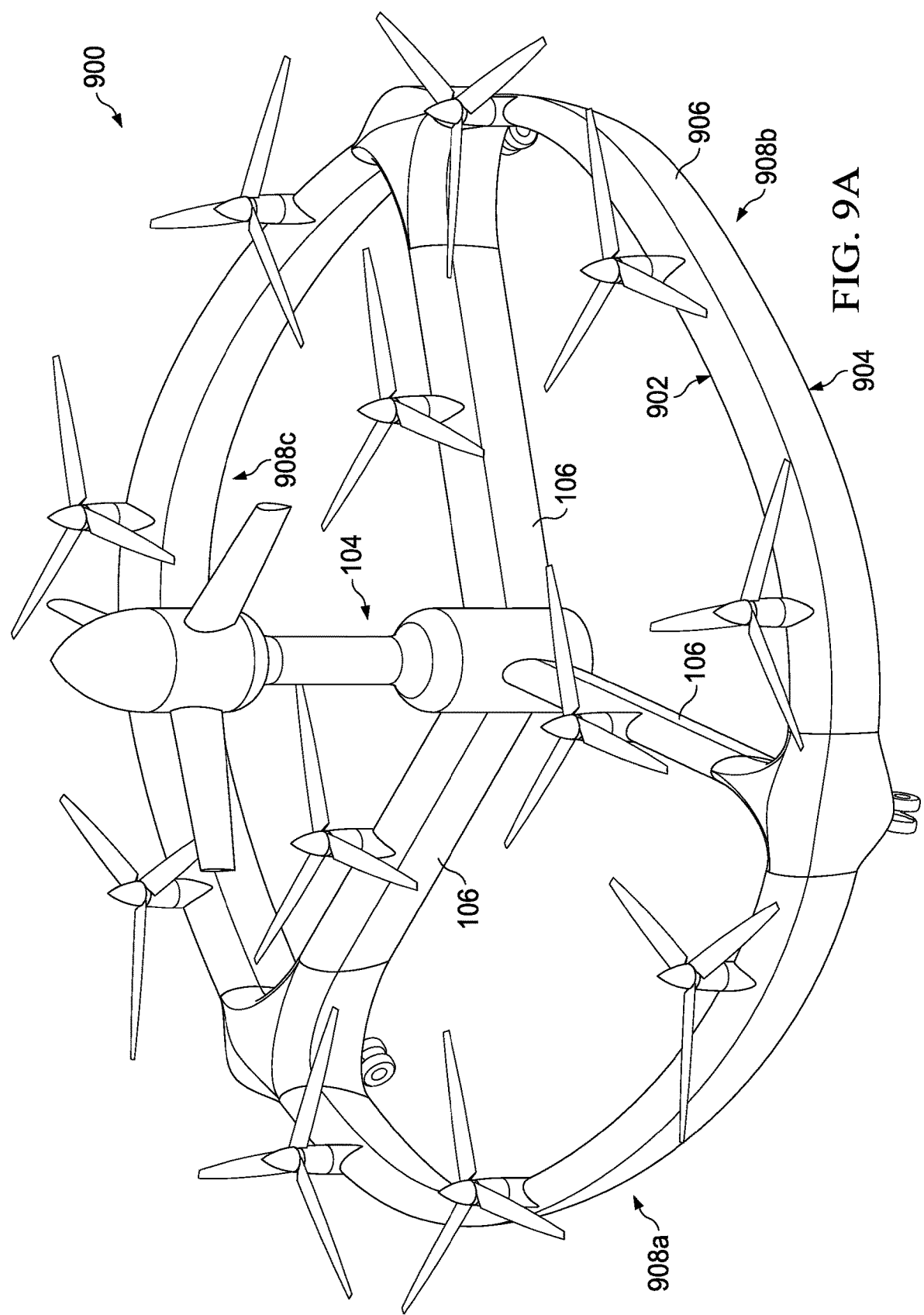
FIG. 9A is a perspective view of a closed wing aircraft having a sinusoidal-shaped circular wing in accordance with one embodiment of the present invention.
Figure 9B:
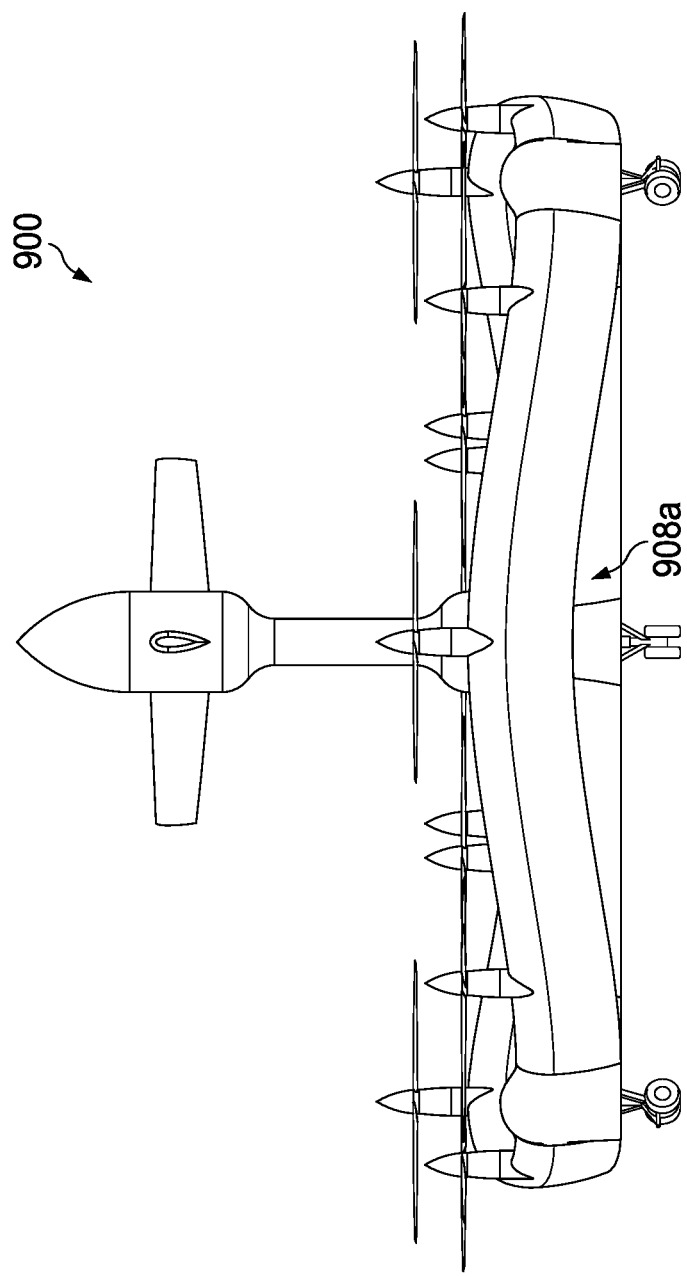
FIG. 9B is a front elevation view of the closed wing aircraft of FIG. 9A.
Figure 9C:
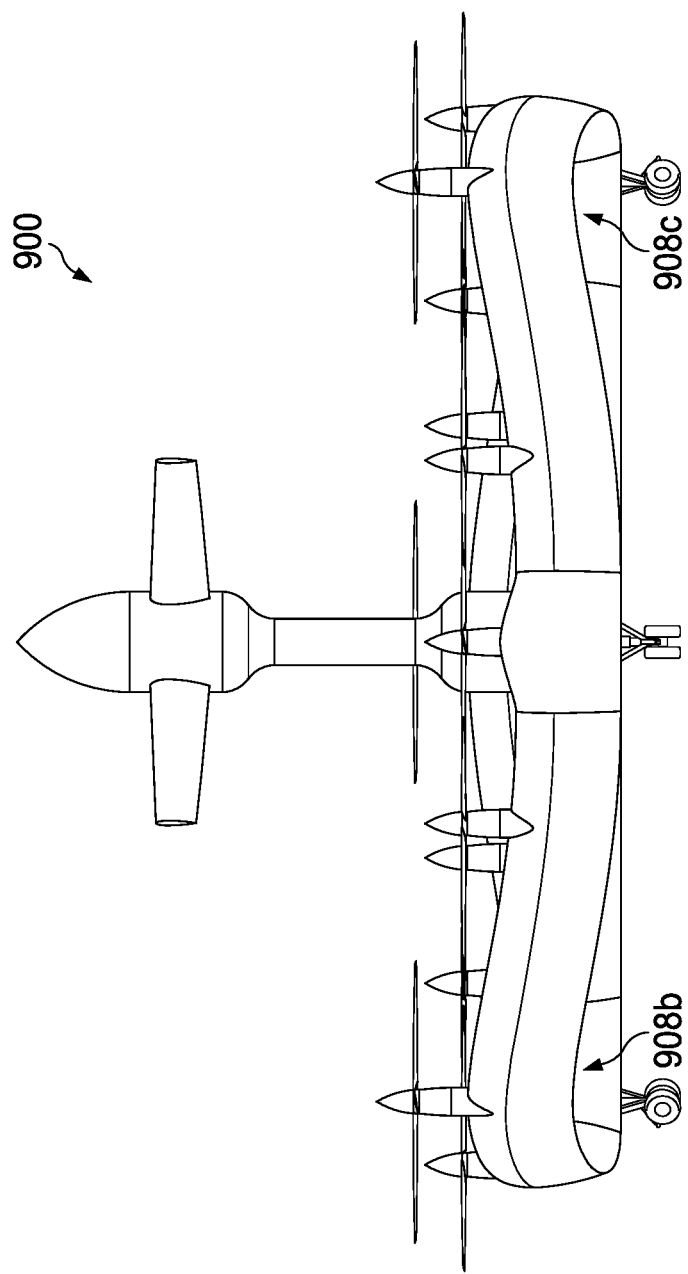
FIG. 9C is a rear elevation view of the closed wing aircraft of FIG. 9A.
Figure 9D:
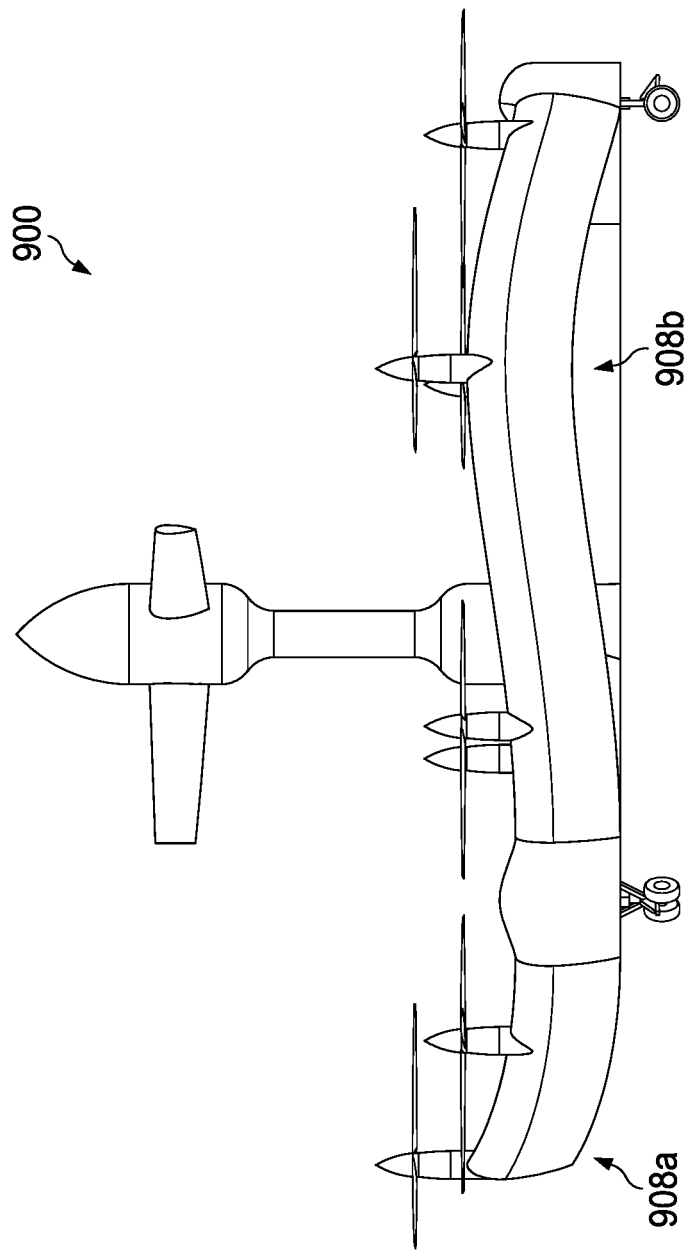
FIG. 9D is a right side elevation view of the closed wing aircraft of FIG. 9A.
Figure 9E:
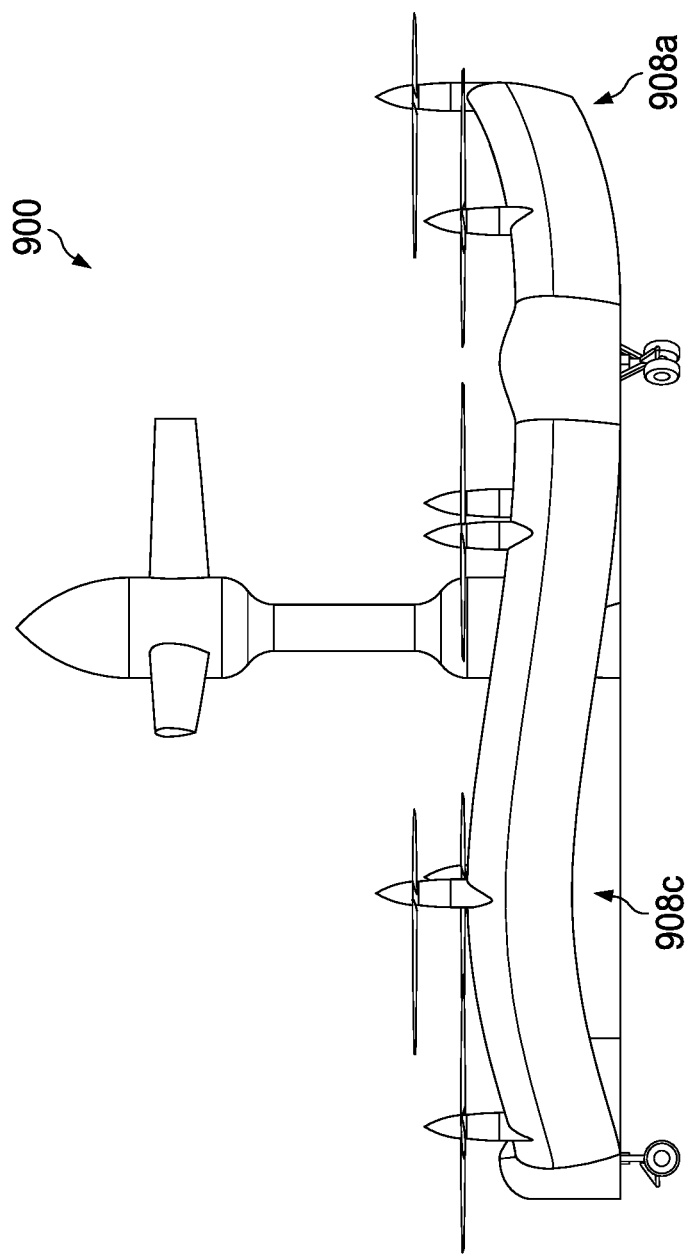
FIG. 9E is a left side elevation view of the closed wing aircraft of FIG. 9A.
Figure 9F:
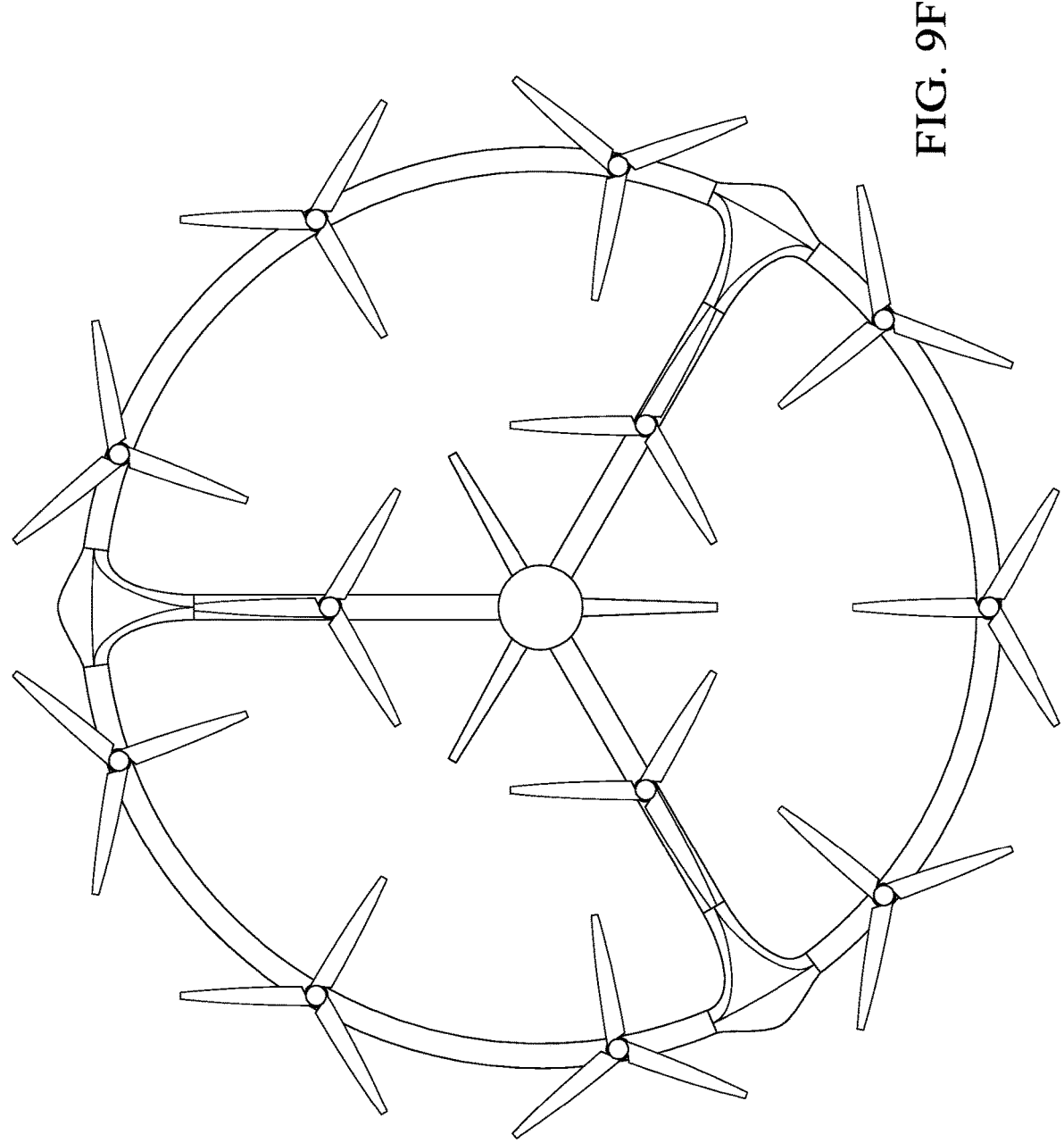
FIG. 9F is a top plan view of the closed wing aircraft of FIG. 9A.
Figure 9G:
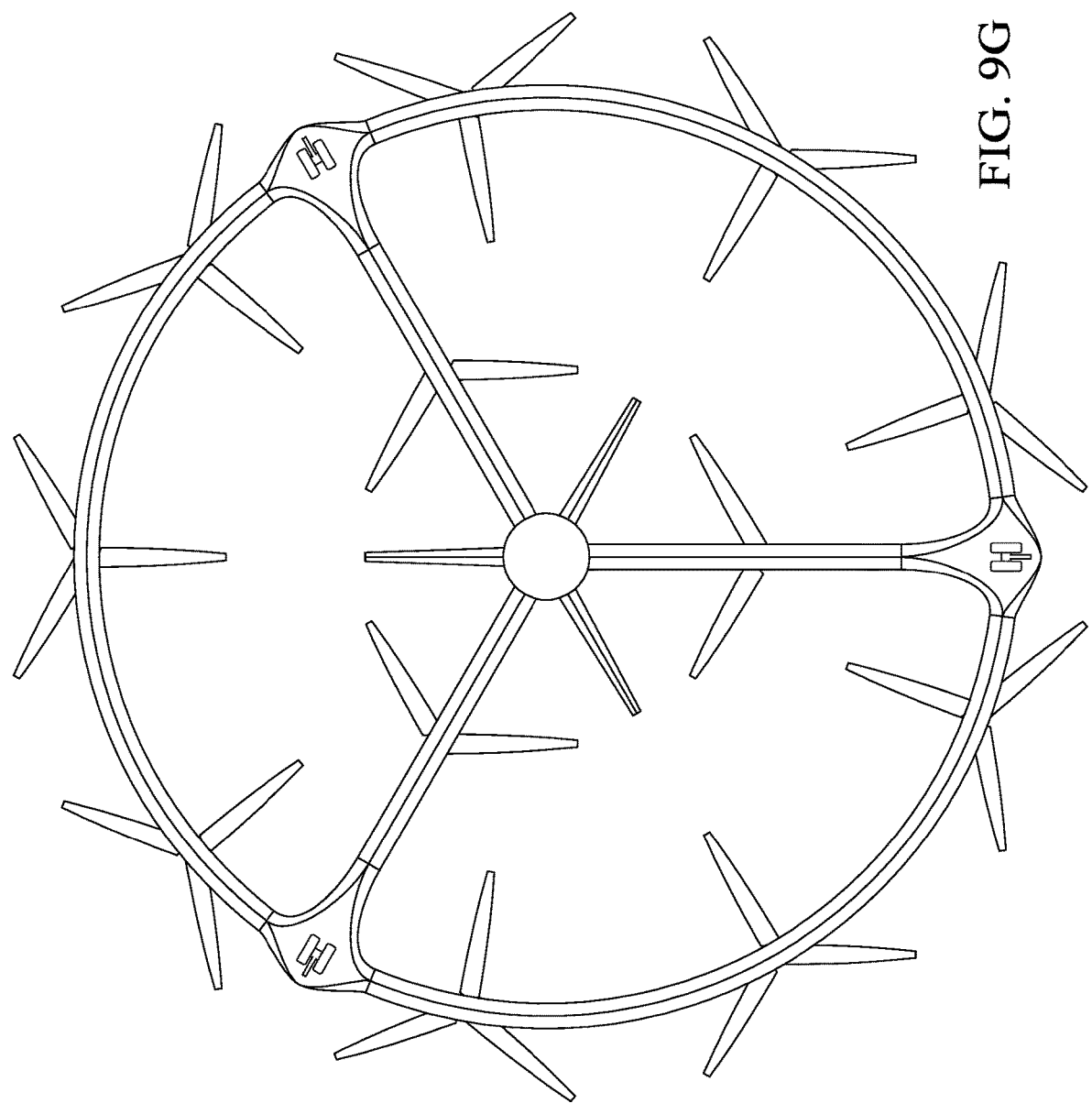
FIG. 9G is a bottom plan view of the closed wing aircraft of FIG. 9A.

Now referring to FIGS. 9A-9G, various views of a closed wing aircraft 900 having a sinusoidal-shaped circular wing in accordance with one embodiment of the present invention are shown. More specifically, FIG. 9A is a perspective view, FIG. 9B is a front elevation view, FIG. 9C is a rear elevation view, FIG. 9D is right side elevation view, FIG. 9E is a left side elevation view, FIG. 9F is a top plan view, and FIG. 9G is a bottom plan view. As shown, the leading edge 902 and trailing edge 904 of the closed wing 906 are sinusoidal-shaped. Instead of the circular wing being a constant height around the center fuselage 104 as previously shown, the wing rises and falls to create three sinusoidal humps 908a, 908b, 908c. The humps 908a, 908b, 908c are at their highest between the three spokes 106 and lowest where the wing 906 attaches to the spokes 106. The advantages of this configuration are as follows: 1) Additional wing ground clearance to the circular wing when landing. With the flat circular wing landing must be close to perpendicular to avoid damaging the wing or the landing gear must be made much longer. 2) Improved access to center fuselage. With the flat circular wing access to the center fuselage is restricted by the height of the wing. 3) Improved stability by moving the wing center of pressure closer to the aircrafts center of gravity. The same benefits are achieved but to a lesser degree with four sinusoidal humps and four spokes and two sinusoidal humps with two spokes. With more than four sinusoidal humps the benefits are negligible. Alternatively, only one of the leading edge 902 or the trailing edge 904 of the closed wing 906 is sinusoidal-shaped. Moreover, other wing shapes can be used.

A method for distributed propulsion of aircraft capable of vertical takeoff and landing and stationary flight includes the steps of determining at least one of aerodynamics, propulsive efficiency, structural efficiency, and weight of the aircraft, selecting a number, size and type of hydraulic or electric motors necessary to provide distributed propulsion for powered operations of the aircraft, selecting a power source having sufficient energy density to power the hydraulic or electric motors connected to propellers to operate the aircraft, and providing a distributed propulsion system. The distributed propulsion system includes a closed wing, a fuselage at least partially disposed within a perimeter of the closed wing, and one or more spokes coupling the closed wing to the fuselage. A plurality of hydraulic or electric motors are disposed within or attached to the closed wing, fuselage or spokes in a distributed configuration. A propeller is proximate to a leading edge of the closed wing or the one or more spokes, operably connected to each of the hydraulic or electric motors and provides lift whenever the aircraft is in vertical takeoff and landing and stationary flight. A source of hydraulic or electric power is disposed within or attached to the closed wing, fuselage or spokes and coupled to each of the of hydraulic or electric motors disposed within or attached to the closed wing, fuselage or spokes, wherein the source of hydraulic or electric power provides sufficient energy density for the aircraft to attain and maintain operations of the aircraft. A controller coupled to each of the hydraulic or electric motors, and one or more processors communicably coupled to each controller that control an operation and speed of the plurality of hydraulic or electric motors.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15% from the stated value.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An aircraft capable of vertical takeoff and landing, stationary flight and forward flight, the aircraft comprising:
   a first wing segment and a second wing segment;
   a fuselage at least partially disposed between the first wing segment and the second wing segment;
   a plurality of spokes coupling the fuselage to the first wing segment and the second wing segment;
   a plurality of electric motors attached to the plurality of spokes in a distributed configuration;
   a plurality of propellers operably connected to the plurality of electric motors;
   a source of power coupled to each of the plurality of electric motors; and
   a processor coupled to the plurality of electric motors;
   wherein the fuselage extends above the first wing segment, the second wing segment, the plurality of spokes, and the propellers when the aircraft is in vertical takeoff and landing and stationary flight, and
   wherein the fuselage is forward of first wing segment, the second wing segment, the plurality of spokes, and the propellers when the aircraft is in forward flight.

2. The aircraft of claim 1, wherein the aircraft is unmanned.

3. The aircraft of claim 1, wherein the source of power is a battery.

4. The aircraft of claim 1, wherein the first wing segment and the second wing segment form a closed wing.

5. The aircraft of claim 1, wherein the plurality of electric motors comprises six electric motors.

6. The aircraft of claim 1, wherein the propellers are variable speed constant pitch propellers.

7. The aircraft of claim 1, wherein three or more of the plurality of propellers are operably connected to one or more of the plurality of motors.

8. An aircraft capable of vertical takeoff and landing, stationary flight and forward flight, the aircraft comprising:
   a first wing segment and a second wing segment;
   a fuselage at least partially disposed between the first wing segment and the second wing segment;
   a plurality of spokes coupling the fuselage to the first wing segment and the second wing segment; and
   a plurality of electric motors attached to the plurality of spokes in a distributed configuration, each electric motor having: a propeller operably connected to the electric motor, a source of power coupled to the electric motor, and a processor coupled to the source of power and connected to the electric motor;
   wherein the fuselage extends above the first wing segment, the second wing segment, the plurality of spokes, and the propellers when the aircraft is in vertical takeoff and landing and stationary flight, and
   wherein the fuselage is forward of the first wing segment, the second wing segment, the plurality of spokes, and the propellers when the aircraft is in forward flight.

9. The aircraft of claim 8, wherein the aircraft is unmanned.

10. The aircraft of claim 8, wherein the source of power is a battery.

11. The aircraft of claim 8, wherein the first wing segment and the second wing segment form a closed wing.

12. The aircraft of claim 8, wherein the plurality of electric motors comprises six electric motors.

13. The aircraft of claim 8, wherein the propellers are variable speed constant pitch propellers.

14. The aircraft of claim 8, wherein three or more of the plurality of propellers are operably connected to one or more of the plurality of motors.

15. An aircraft capable of vertical takeoff and landing, stationary flight and forward flight, the aircraft comprising:
   a plurality of wing segments;
   a fuselage at least partially disposed within a perimeter of the plurality of wing segments;
   a plurality of spokes coupling the fuselage to the plurality of wing segments;
   a plurality of electric motors attached to the plurality of spokes or wing segments in a distributed configuration;
   a plurality of propellers operably connected to the plurality of motors;
   a source of power coupled to each of the plurality of motors; and
   a plurality of controllers, each controller coupled to the source of power, and each controller connected to one of the plurality of motors;
   wherein the fuselage extends above the plurality of wing segments and the propellers when the aircraft is in vertical takeoff and landing and stationary flight, and
   wherein the fuselage is forward of the plurality of wing segments and the propellers when the aircraft is in forward flight.

16. The aircraft of claim 15, wherein the aircraft is unmanned.

17. The aircraft of claim 15, wherein the source of power is a battery.

18. The aircraft of claim 15, wherein the plurality of motors comprises six motors.

19. The aircraft of claim 15, wherein the propellers are variable speed constant pitch propellers.

20. The aircraft of claim 15, wherein three or more of the plurality of propellers are operably connected to one or more of the plurality of motors.

* * * * *